(12) United States Patent
Otto

(10) Patent No.: US 6,244,514 B1
(45) Date of Patent: *Jun. 12, 2001

(54) SMART CARD FOR STORAGE AND RETRIEVAL OF DIGITALLY COMPRESSED COLOR IMAGES

(75) Inventor: Anthony H. Otto, Signal Hill, CA (US)

(73) Assignee: Ayao Wada, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/063,255

(22) Filed: Apr. 20, 1998

(51) Int. Cl.$^7$ ..................................................... G06K 19/06
(52) U.S. Cl. ................................. 235/492; 382/232; 902/3
(58) Field of Search .................................... 235/487, 488, 235/489, 492, 379–382, 382.5; 900/26; 380/23–25, 28, 29

(56) References Cited

U.S. PATENT DOCUMENTS

| | | | | |
|---|---|---|---|---|
| 4,205,341 | * | 5/1980 | Mitsuya et al. | 358/135 |
| 4,238,768 | * | 12/1980 | Mitsuya et al. | 358/135 |
| 4,319,267 | * | 3/1982 | Mitsuya et al. | 358/75 |
| 4,580,134 | * | 4/1986 | Campbell et al | 340/703 |
| 4,582,985 | * | 4/1986 | Lofberg | 235/380 |
| 4,743,959 | * | 5/1988 | Frederiksen | 358/11 |
| 5,164,831 | | 11/1992 | Kuchta . | |
| 5,214,699 | * | 5/1993 | Monroe et al. . | |
| 5,268,963 | | 12/1993 | Monroe . | |
| 5,295,077 | | 3/1994 | Fukuoka . | |
| 5,623,552 | * | 4/1997 | Lane | 382/124 |
| 5,844,614 | * | 12/1998 | Chong et al. | 348/420 |
| 5,872,864 | * | 2/1999 | Imade et al. | 382/176 |
| 5,883,823 | * | 3/1999 | Ding | 364/725.03 |
| 6,052,488 | * | 4/2000 | Takahashi et al. | 382/239 |
| 6,088,391 | * | 7/2000 | Auld et al. | 375/240 |
| 6,088,392 | * | 7/2000 | Rosenberg | 375/240 |
| 6,104,430 | * | 8/2000 | Fukuoka | 348/232 |

FOREIGN PATENT DOCUMENTS

| | | |
|---|---|---|
| 2 223 614 | 4/1990 | (GB) . |
| 00-101849 A | * 4/2000 | (JP) . |

OTHER PUBLICATIONS

Edward J. Delp, Student Member, IEEE & O. Robert Mitchell, Member, IEEE, IEEE Transactions On Communications, vol. Com–27, No. 9, Sep. 1979, pp. 1335–1342.

European Search Report, completed Oct. 2000; Class G06K19/07, G06T9/00, H04N1/21.

* cited by examiner

Primary Examiner—Karl D. Frech
Assistant Examiner—Diane L Lee
(74) Attorney, Agent, or Firm—Fulwider Patton Lee & Utecht, LLP

(57) ABSTRACT

A card containing a programmable microchip having a memory for storing a color identification photograph. A color identification image is digitally compressed from a photograph by a novel method which makes practical the use of a relatively small amount of memory for the storage of the image.

4 Claims, 26 Drawing Sheets

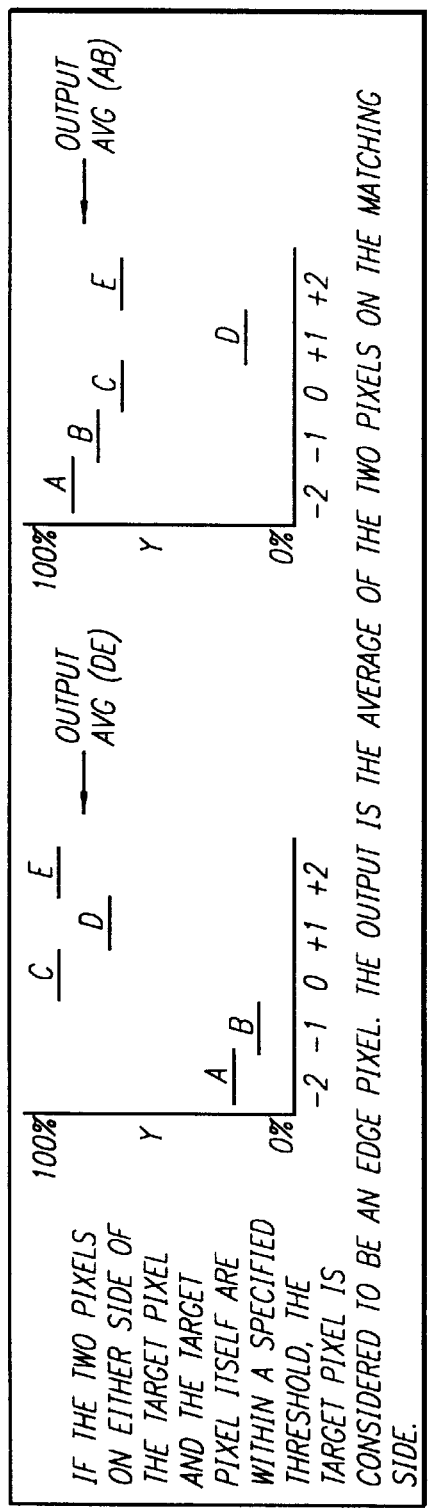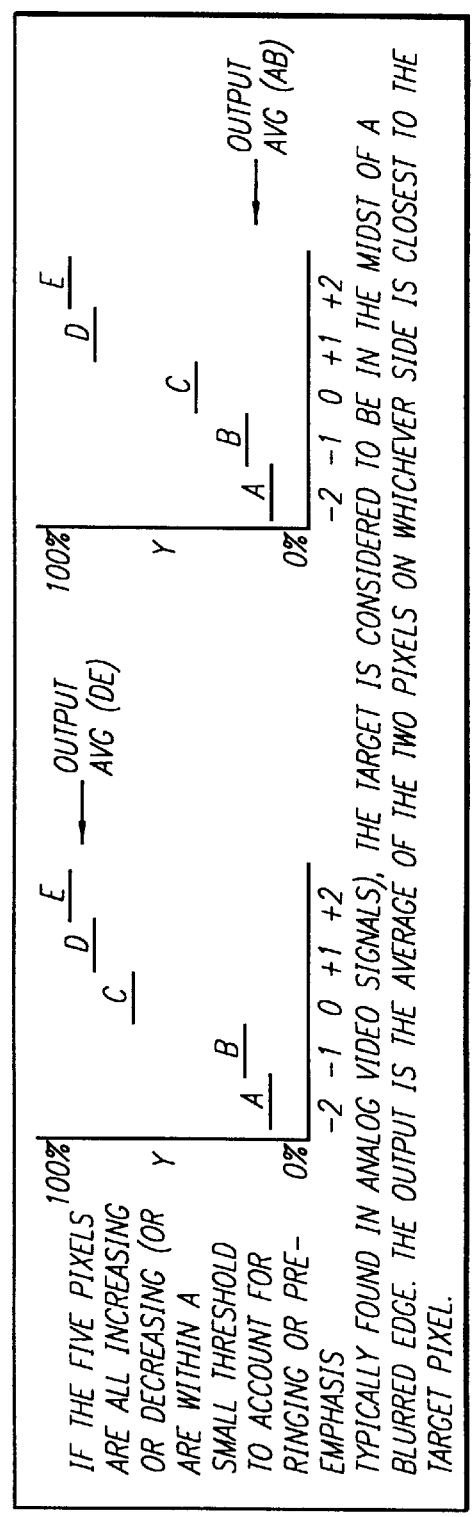

FIG. 17A
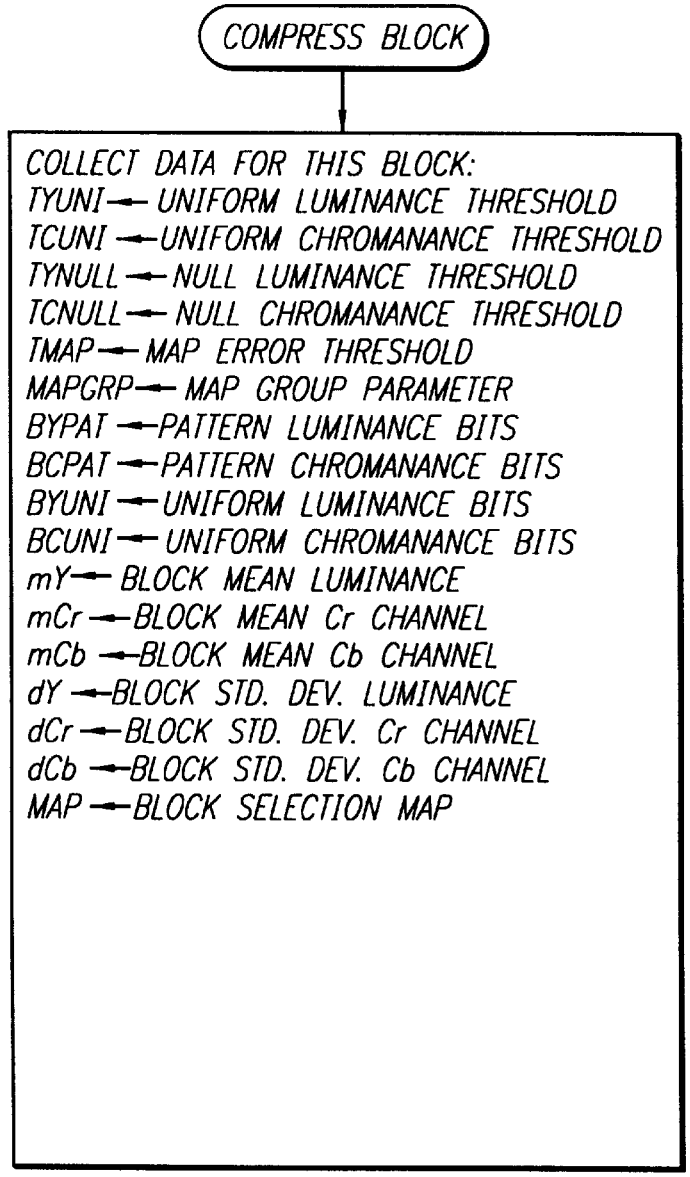
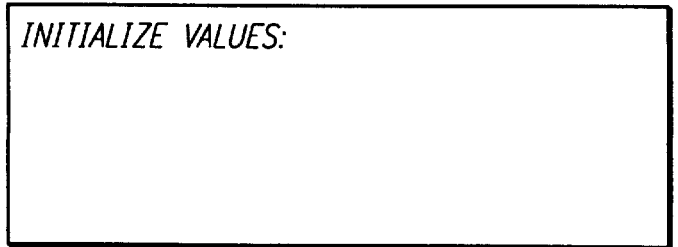
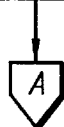

IF MOST OF THE BITS IN MAP ARE ON OR OFF, SET TO ZERO MAP AND DEVIATION

ASSUMES TWO ENTRIES IN GROUP ONE

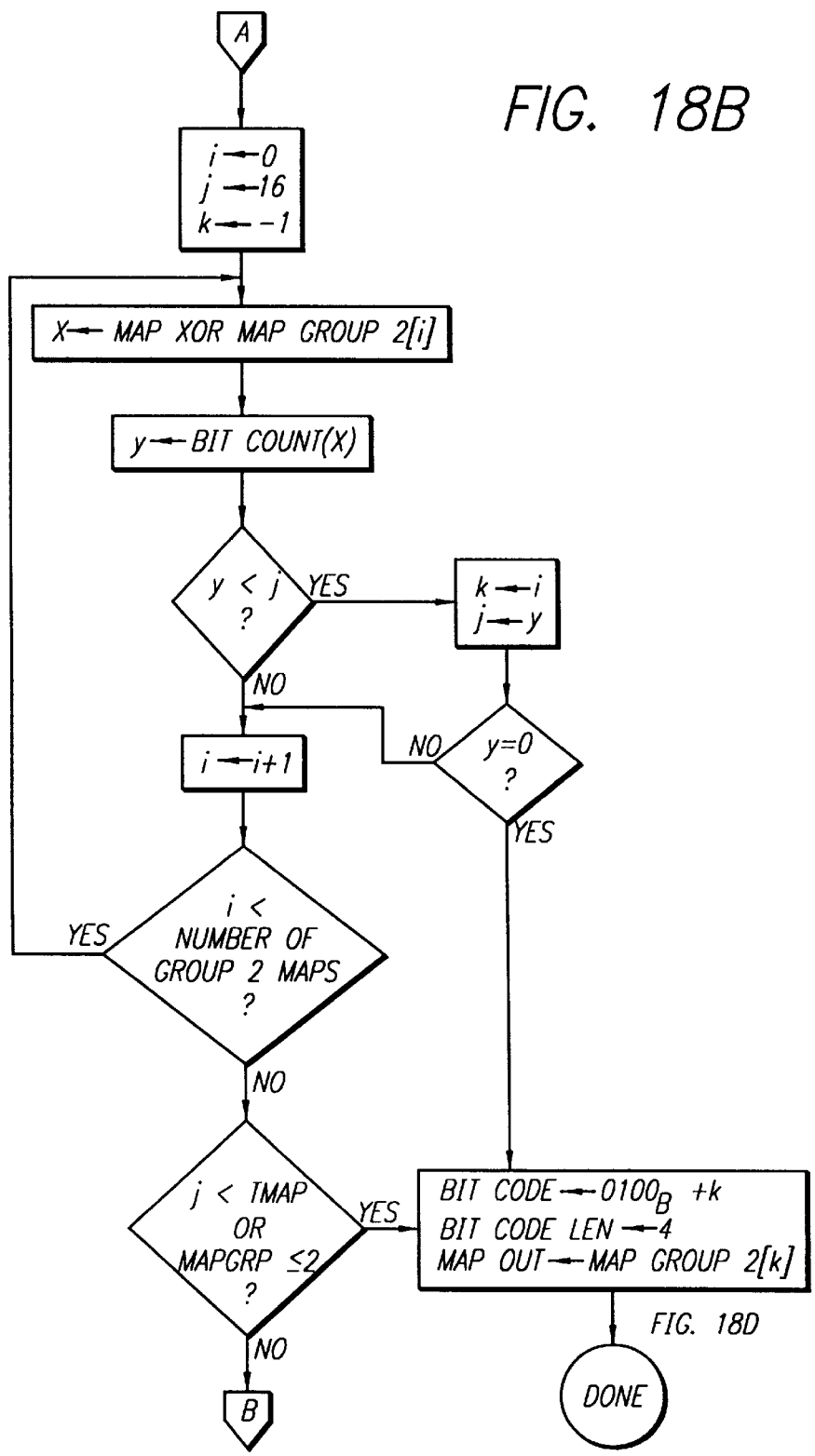

SMART CARD FOR STORAGE AND RETRIEVAL OF DIGITALLY COMPRESSED COLOR IMAGES

BACKGROUND OF THE INVENTION

1. Field of the Invention

The invention relates generally to information signal processing, and more particularly relates to digital compression of color images for storage of the images in a smart card containing a programmable microchip having a memory for storing a color identification photograph.

2. Description of Related Art

One technique that has been used in digital encoding of image information is known as run length encoding. In this technique, the scan lines of a video image are encoded as a value or set of values of the color content of a series of pixels along with the length of the sequence of pixels having that value, set of values, or range of values. The values may be a measure of the amplitude of the video image signal, or other properties, such as luminance or chrominance. Statistical encoding of frequent color values can also be used to reduce the number of bits required to digitally encode the color image data.

One basic encoding process is based upon the block truncation coding (BTC) algorithm published by Mitchell and Delp of Purdue University in 1979. The basic BTC algorithm breaks an image into 4×4 blocks of pixels and calculates the first and second sample moments. Based upon an initial quantizer, set to the first sample moment (the arithmetic mean), a selection map of those pixels lighter or darker than the quantizer is determined, along with a count of the lighter pixels. From the first and second sample moments, the sample variance, and therefore, the standard deviation, can be calculated. The mean, standard deviation, and selection map are preserved for each block. However, the original BTC method is limited to a grayscale, so that it would be desirable to adapt the BTC method to extend the BTC method to include YCrCb full-color. It would also be desirable to adapt the BTC method to handle delta values, allowing multi-level, or hierarchical, encoding and allowing encoding of differences between frames or from a specified background color.

The range of color values for any given pixel in a color image can be described, for example, as RGB color space, illustrated in FIG. 1, that can be represented by a conventional three-dimensional Cartesian coordinate system, with each axis representing 0 to 100% of the red, green and blue values for the color value of the pixel. A grayscale line can be described as running diagonally from black at 0% of each component to white at 100% of each. Since human vision can only discriminate a limited number of shades of color values, by selecting representative color values in such a color space, a limited number of color values can be used to approximate the actual color values of an image such that the human eye can not differentiate between the actual color values and the selected color values.

As is illustrated in FIGS. 2 and 3, human vision can be characterized by the Hue-Value-Saturation (HVS) color system. Hue is defined as the particular color in the visible spectrum ranging from red through green and blue to violet. Value is defined as the brightness level, ignoring color. Saturation is defined as the intensity of the particular color or the absence of other shades in the mixture. The HVS system can be represented by a generally cylindrical coordinate system with a polar base consisting of hue as the angle, and saturation as the radius. The value or brightness component is represented as the altitude above the base. The actual visible colors do not occupy the entire cylinder, but are approximately two cones, base to base with their vertices at 0% up to 100% on the value scale. The base is tilted in this example because the maximum saturation for blue occurs at a much lower brightness than the maximum saturation of green.

Referring to FIG. 2, in order to represent digitized NTSC/PAL video in a Cartesian coordinate system, the YCrCb color space is used. Because the smart card system of the invention operates in the YCrCb color space, the smart card system provides for a novel color space conversion from 15- or 24-bit RGB. Eight-bit grayscale images are also supported. Referring also to FIG. 3, the chrominance components, Cr and Cb, are two axes that correspond to the polar hue and saturation components in the HVS system. The Y, or luminance, component corresponds to the brightness axis in the HVS graph. This description does not account for the slight differences between YIQ and YUV for NTSC- and PAL-based encoding, which does not form a part of the invention. The following equations can be used to convert from RGB to the YCrCb color space:

$Y = 0.299R + 0.587G + 0.114B$ $Cr = 0.713 (0.701R - 0.587G + 0.114B)$ $Cb = 0.564 (-0.299R - 0.587G + 0.866B)$

Typical implementations of digitally representing color values in this fashion use floating point arithmetic (11 multiplications and 9 additions/subtractions per pixel) or 16-bit integer arithmetic (9 multiplications, 9 additions/subtractions and 3 division per pixel). Both of these methods are quite wasteful of computing power, particularly on smaller microcontrollers. There is thus a need for a system for representing color values of digitized images that takes advantage of the limitations of human vision in discriminating color in color images in order to reduce the software and hardware requirements, particularly for storage of such color images in smart cards and databases. Smart cards are commonly approximately the same shape and size of a common credit card, and typically contain a programmable microchip, having a memory such as a read only memory, or a read/write memory. Information stored in the memory of the card can be detected by a card interface device such as a card reader or connector.

Unfortunately, noise can seriously interfere with the efficiency of any image compression process, lossy or lossless, because a compression engine must use more unnecessary data to encode noise as if it were actual subject material. Since lossy compression tends to amplify noise creating more noticeable artifacts upon decompression, lossy compression processes therefore typically attempt to remove some of the noise prior to compressing the data. Such preprocessing filters must be used very carefully, because too little filtering will not have the desired result of improved compression performance, and too much filtering will make the decompressed image cartoon-like.

Another technique used for removing unwanted noise from color image data is chromakeying, which is a process of replacing a uniform color background (usually blue) from behind a subject. A common application of this process is a television weather reporter who appears to be standing in front of a map. In actuality, the reporter is standing in front of a blue wall while a computer generated map is replacing all of the blue pixels in the image being broadcast.

While preprocessing filters can remove noise from the area surrounding a subject of interest in an image, subtle changes in lighting or shading can remain in the original image which can be eliminated by chromakeying. There is thus a need to provide a chromakey system in compression of color images for storage on smart cards and databases, in order to replace the background with a solid color to increase the visual quality of the compressed image. It would also be desirable to automate and simplify the chromakey process, to simplify the chromakey process for the operator.

The present invention meets these and other needs.

SUMMARY OF THE INVENTION

The present invention provides for an improved smart card system for digitally storing color identification photographs compressed into 512 to 2,048 bytes for storage in inexpensive contact-less smart cards or in databases. The compression system of the invention accepts rectangular images in 16 pixel increments ranging from 48 to 256 pixels on a side. The typical size is 96×96 pixels. The system of the invention is designed for very low computational power implementations such as 8-bit microcontrollers, possibly with an ASIC accelerator.

Briefly, and in general terms, the present invention accordingly provides for a smart card containing a programmable microchip having a memory for storing a color identification photograph method for digital compression of a color image containing color image data consisting of a plurality of scan lines of pixels with color values, such as for a color identification photograph, for storage of the color image. The color image data is filtered by evaluating the color values of individual pixels in the color image with respect to neighboring pixels, and the color image data is statistically encoded by dividing the color image into an array of blocks of pixels, and encoding each block of pixels into a fixed number of bits that represent the pixels in the block.

In a presently preferred aspect of the method, the step of statistically encoding the color image data comprises determining a first sample moment of each block as the arithmetic mean of the pixels in the block, determining a second sample moment of the pixels in the block, and determining a selection map of those pixels in the block having color values darker or lighter than a quantizer set to the first sample moment, along with a count of the lighter pixels. Statistically encoding the color image data entails determining the sample variance and the standard deviation of the pixels in the block based upon the first and second sample moments.

In another aspect of the invention, each block is classified, quantized, and compressed by codebook compression using minimum redundancy, variable-length bit codes. The step of classifying each block comprises classifying each block according to a plurality of categories, and the step of classifying each block typically comprises classifying each of the blocks in one of four categories: null blocks exhibiting little or no change from the higher level or previous frame, uniform blocks having a standard deviation less than a predetermined threshold, uniform chroma blocks having a significant luminance component to the standard deviation, but little chrominance deviation, and pattern blocks having significant data in both luminance and chrominance standard deviations.

In a presently preferred aspect of the method, the number of bits to be preserved for each component of the block are determined after each block is classified, and the number of bits for the Y and Cr/Cb components is reduced independently for each classification. The texture map of the block is also preferably matched with one of a plurality of common pattern maps for uniform chroma and pattern classified blocks. All components of each block are preserved for pattern blocks; the mean luminance and chrominance, standard deviation luminance, and a selection map are preserved for uniform chroma blocks; and the mean values are preserved for all three color components for uniform blocks.

The step of filtering currently preferably comprises evaluating each individual pixel as a target pixel and a plurality of pixels in close proximity to the target pixel to determine an output value for the target pixel, and in a currently preferred aspect of the method of the invention, the step of filtering comprises evaluating a sequence of five pixels, including two pixels on either side of the target pixel and the target pixel itself, for each target pixel.

In a presently preferred embodiment, the step of filtering comprises determining an average of the data for a window of the pixels immediately surrounding the target pixel for those pixels surrounding the target pixel that are within a specified range of values, according to the following protocol: if all five pixels are within the specified range, the output target pixel is determined to be the average of the four pixels in a raster line on each side of the target pixel; if the two pixels on either side are within a specified range and both sides themselves are within the range, the target pixel is determined to be impulse noise, and the filtered output target pixel data is determined to be the average of the two pixels on each side of the target pixel; if the two pixels on either side of the target pixel and the target pixel itself are within a specified range, and the other two pixels on the other side are not within the specified range, the target pixel is determined to be an edge pixel, and the output target pixel is determined to be the average of the two pixels on the matching side that fall within the specified range; if the five pixels are all increasing or decreasing, or are within a small range to account for ringing or pre-emphasis typically found in analog video signals, the target pixel is treated as being in the midst of a blurred edge, and the output target pixel is then determined to be the average of two pixels on whichever side of the target pixel is closest in value to the target pixel; and if the five pixels in the window do not fit into any of the prior cases, the output target pixel is unchanged.

A currently preferred aspect of the method of the invention further comprises replacing the background in the color image being compressed with a solid color, in order to reduce noise in the image, and to increase the visual quality of the compressed image. A significant part of replacing background in the color image being compressed with a solid color comprises calibrating an initial chromakey value and color of the background color. In one presently preferred embodiment, the step of calibrating comprises capturing at least one calibration image of the background prior to capturing an image with a subject of interest in place, consisting substantially of background pixels, and determining the average and standard deviation of the at least one calibration image to set at least an initial chromakey color and range. In another presently preferred embodiment, the step of calibrating comprises capturing an image with a subject of interest in place, and beginning in the upper-left and upper-right corners of the image, collecting pixels down and towards the center of the image until an edge or image boundary is encountered, and determining the average and standard deviation of those pixels to set at least an initial chomakey value and range. In another presently preferred embodiment, the step of calibrating comprises manually specifying an initial chromakey value and range without respect to the properties of an individual image being captured prior to image capture.

Another preferred aspect of the method of the invention comprises converting digital color image data to the YCrCb (Luminance-Chrominance) color space. In a currently preferred embodiment, this involves converting the color image data from the RGB (Red-Green-Blue) color space. In a currently preferred aspect of the method, the step of converting digital color image data to the YCrCb (Luminance-Chrominance) color space comprises utilizing lookup tables of selected color values for color space conversion, and preferably the step of converting digital color image data to the YCrCb (Luminance-Chrominance) color space comprises utilizing nine 256-entry one-byte lookup tables containing the contribution that each R, G and B make towards the Y, Cr and Cb components.

These and other aspects and advantages of the invention will become apparent from the following detailed description and the accompanying drawings, which illustrate by way of example the features of the invention.

BRIEF DESCRIPTION OF THE DRAWINGS

FIGS. 6 to 10 illustrate color image data preprocessing filter protocols according to the method of the present invention for compressing color image data;

FIGS. 17A to 17E show a flow chart for codebook compression according to the method of the present invention for compressing color image data;

FIGS. 18A to 18D show a flow chart for encoding pattern maps according to the method of the present invention for compressing color image data.

DETAILED DESCRIPTION OF THE PREFERRED EMBODIMENTS

Figure 1:
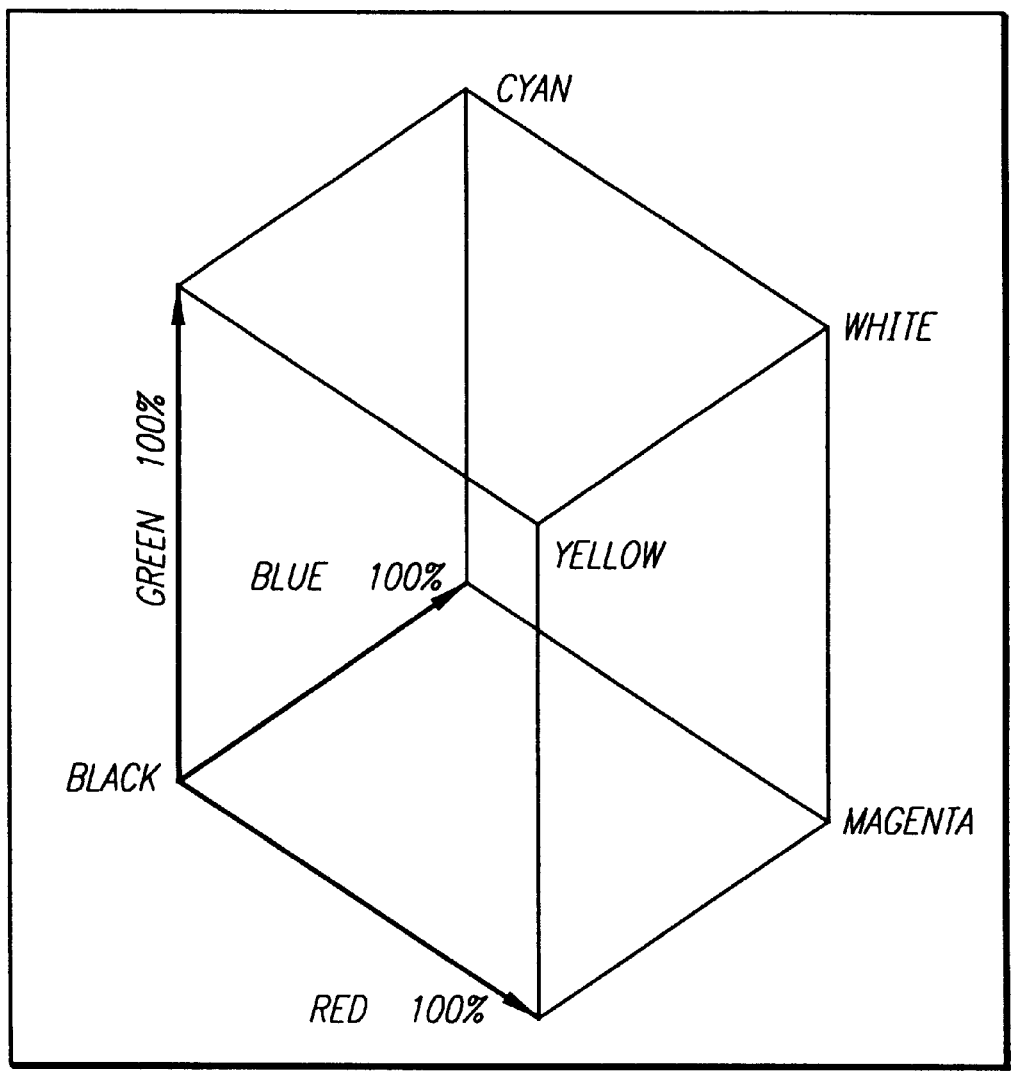
FIG. 1 is a schematic representation of an RGB color space known in the prior art.
Figure 3:
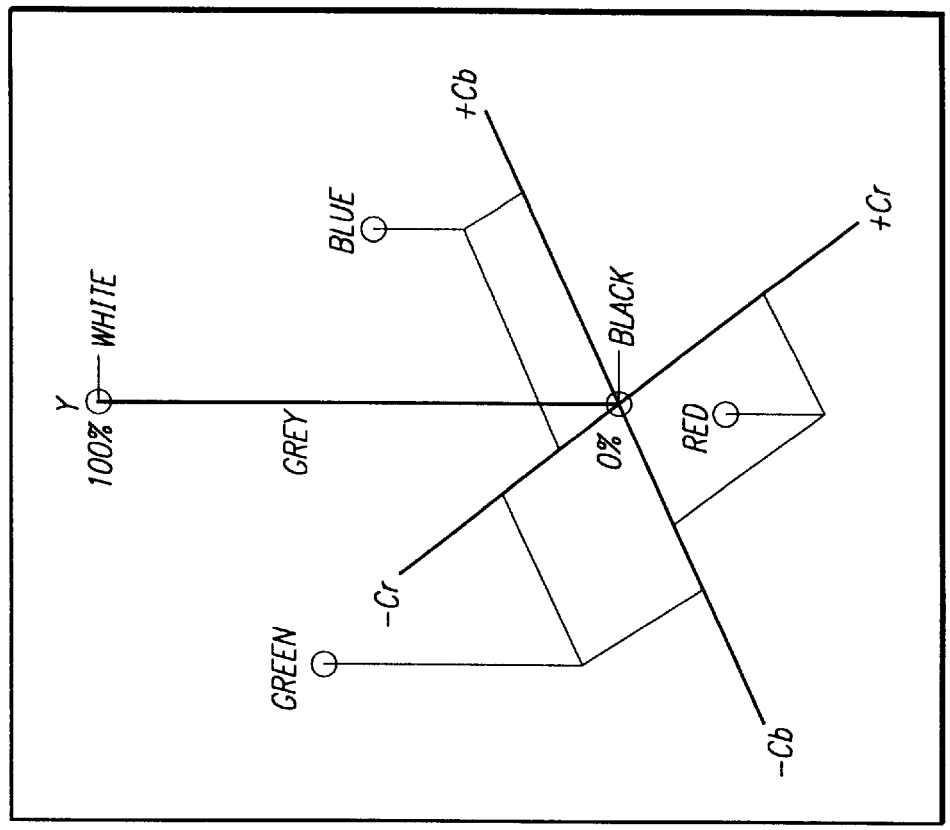
FIG. 3 is a schematic representation of NTSC/PAL video color system in the YCrCb color space known in the prior art.
Figure 2:
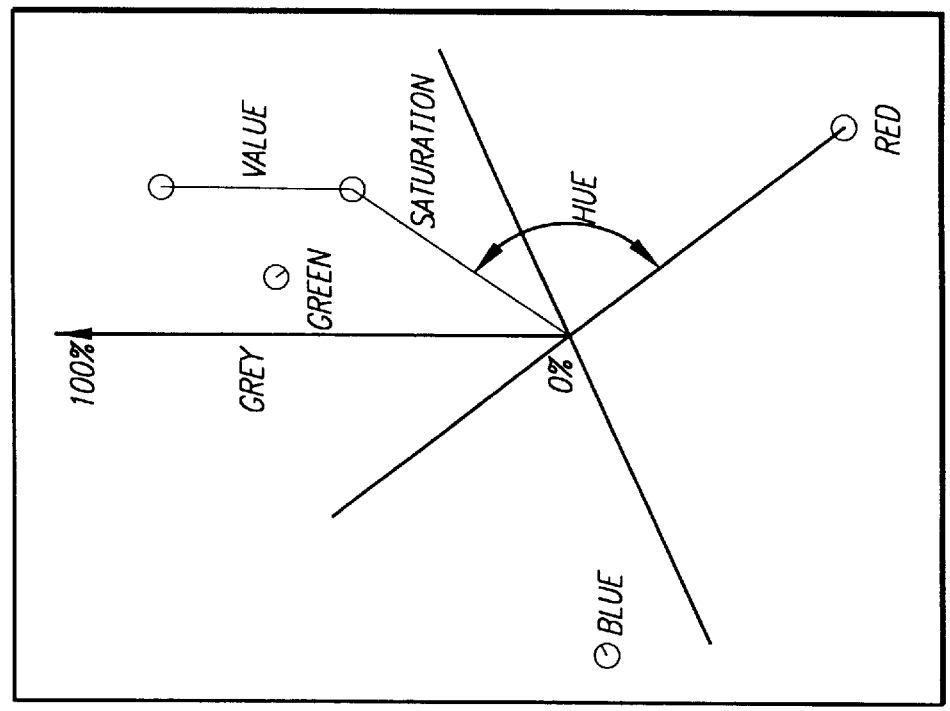
FIG. 2 is a schematic representation of NTSC/PAL video color system in the HVS color space known in the prior art.
Figure 4:
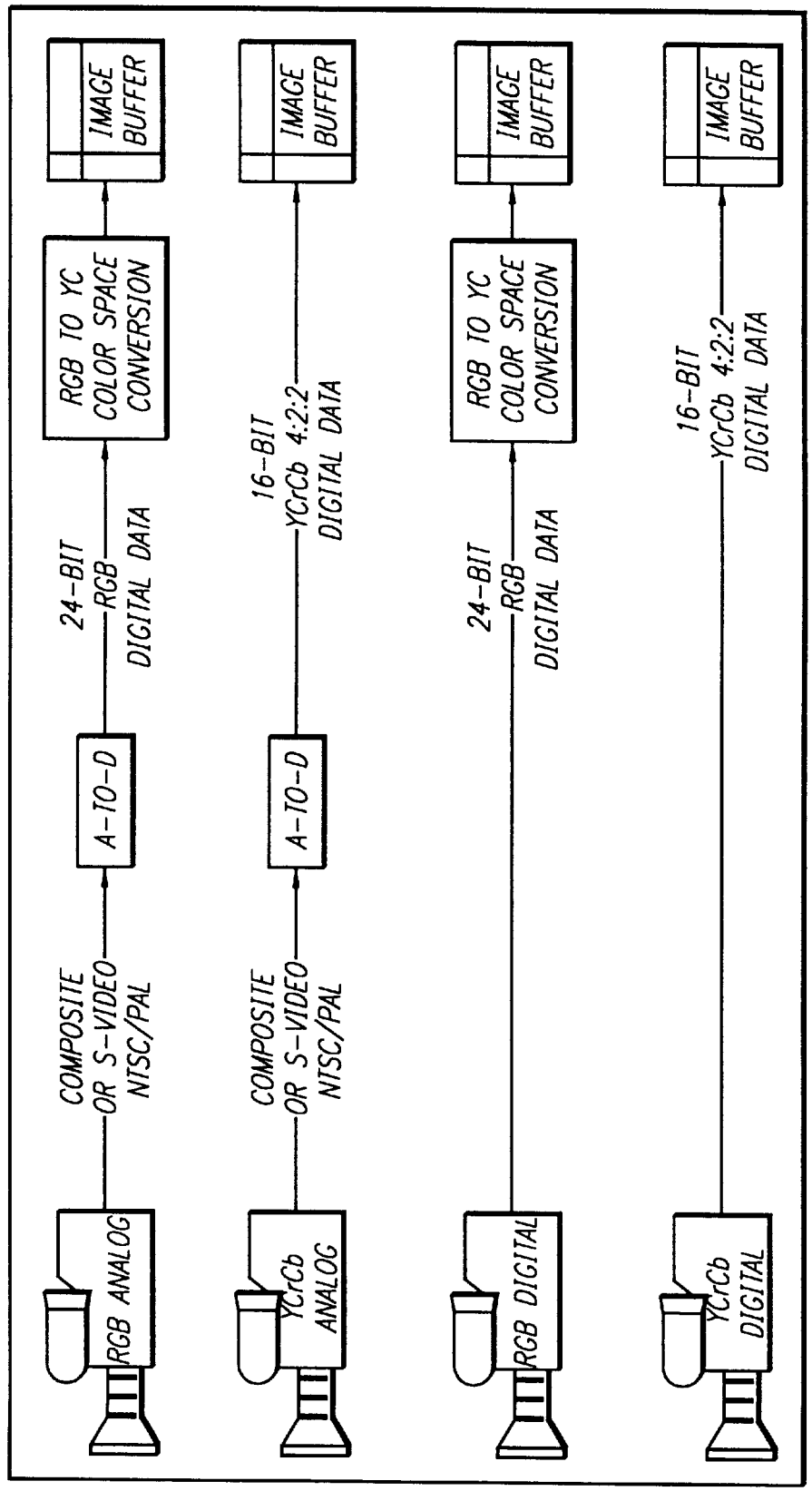
FIG. 4. is a schematic diagram illustrating the process of image acquisition for the method of the present invention for compressing color image data.
Figure 5:
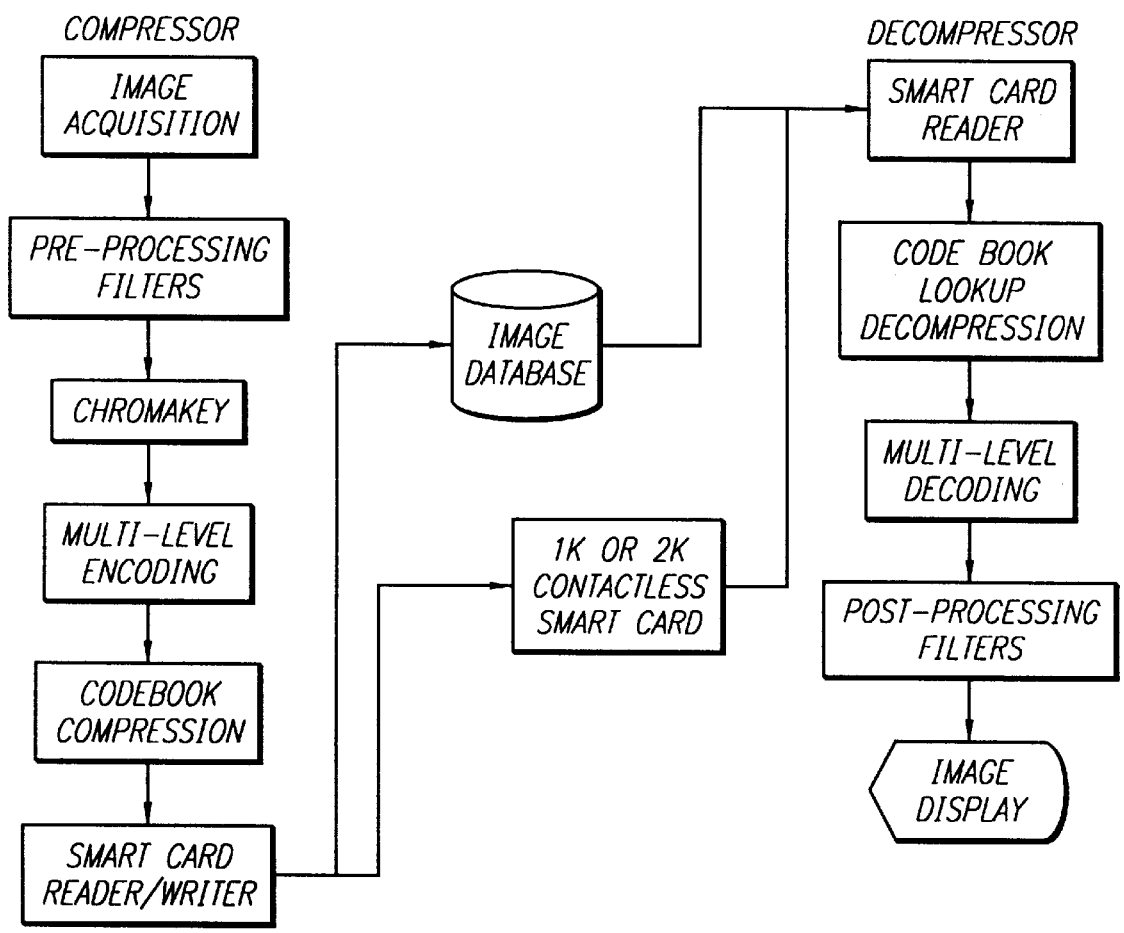
FIG. 5 is a schematic diagram of an overview of the method of the present invention for compressing color image data for storage and use on a smart card.

While BTC statistical encoding can be used to reduce the number of bits required to digitally encode image data, the BTC method is limited to simple encoding of grayscale images. Digital color image compression methods typically use floating point arithmetic or 16-bit integer arithmetic, which are quite wasteful of computing power, particularly for encoding of color image data on smart cards and databases. Noise can also seriously interfere with the efficiency of the image compression process, and although preprocessing filters can be used to remove noise, too much filtering can make the decompressed image cartoon-like, while too little filtering may not be sufficient to improve compression performance.

As is illustrated in the drawings, which are presented for purposes of illustration and are not intended to limit the scope of the invention, the present invention accordingly provides for a method for digital compression of color images such as color identification photographs for storage of the color images in smart cards and databases. Digital color image data typically from a video camera or an existing digitized photograph are first converted from the RGB (Red-Green-Blue) color space to the YCrCb (Luminance-Chrominance) color space.

At (or prior to) compile time, nine 256-entry one-byte lookup tables of selected color values are prepared containing the contribution that each R, G and B make towards the Y, Cr and Cb components, for i=0..255, as follows:

1) $RY[i]=224 \cdot 0.299 \cdot i/225=0.263 \cdot i$
2) $GY[i]=224 \cdot 0.587 \cdot i/225=0.516 \cdot i$
3) $BY[i]=224 \cdot 0.114 \cdot i/225=0.100 \cdot i$
4) $RCr[i]=255 \cdot 0.713 \cdot 0.701 \cdot i/225=0.441 \cdot i$
5) $GCr[i]=255 \cdot 0.713 \cdot -0.587 \cdot i/225=-0.369 \cdot i$
6) $BCr[i]=255 \cdot 0.713 \cdot -0.114 \cdot i/225=0.072 \cdot i$
7) $RCb[i]=255 \cdot 0.564 \cdot -0.299 \cdot i/225=-0.149 \cdot i$
8) $GCb[i]=255 \cdot 0.564 \cdot -0.587 \cdot i/225=-0.292 \cdot i$
9) $BCb[i]=255 \cdot 0.564 \cdot 0.886 \cdot i/225=0.441 \cdot i$ Once completed, the table can be used to convert a pixel from RGB to YCrCb as follows:

$Y=RY[r]+GY[g]+BY[b]$ $Cr=RCr[r]+GCr[g]+BCr[b]$ $Cb=RCb[r]+GCb[g]+BCb[b]$

This method requires 8304 bytes of constant ROM, six 8-bit additions and nine table lookups. The nine table lookups might require a 16-bit addition each, but more likely, the microcontroller could handle the lookup through an opcode or built-in addressing mechanism.

The color image digital compression method of the invention has unique requirements, since it is to be used for storage of color identification photographs on smart cards and databases. First, the information density is very high, since all of the features of a human face are represented in 6,000 to 7,000 pixels, ignoring the background. Secondly, small block encoding techniques, upon which the present invention is based, are particularly friendly to sharp edges. Third, the method of the invention is targeted for low computational power devices, making floating point, 25-pixel convolutions impractical. Due to bandwidth restrictions of the analog video signal, edges of objects are usually quite blurry. Conventional low pass convolutions used for noise reduction make this problem even worse. Conventional median or directional smoothing filters are very effective at removing impulse noise, but tend to be too aggressive for this application, because features like eyes and teeth are discarded.

The method of the invention therefore implements a preprocessing filter with three goals: 1) reducing noise without removing important face features, 2) sharpen blurred edges, and 3) not to be computationally complex. The preprocessing filter utilizes a five pixel window on a single scan line to determine the output value for the center pixel. For each target pixel, a sequence of five pixels, including 2 pixels on either side of the target pixel and the target pixel itself, are evaluated. Five cases are accounted for in the following discussion, which is directed only to the component of luminance, for simplicity. All three components (YCrCb) are included in the actual filters.

Figure 6:
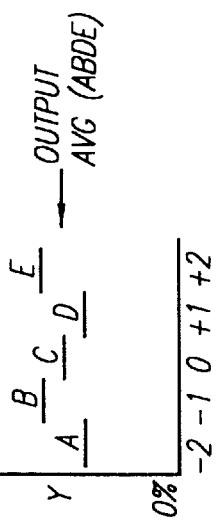
Figure 7:
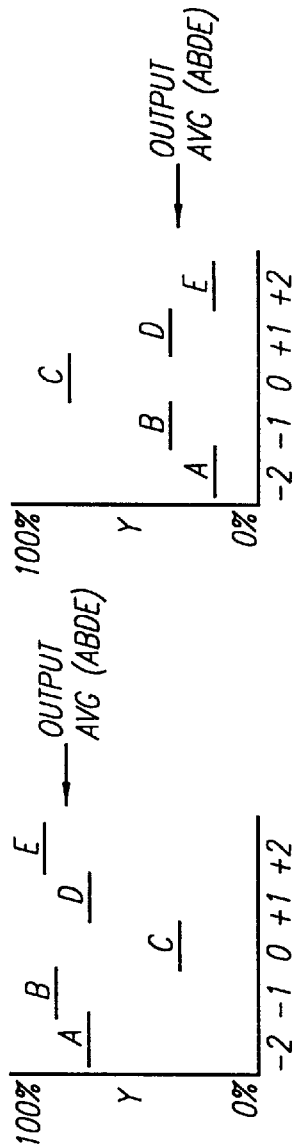
Figure 10:
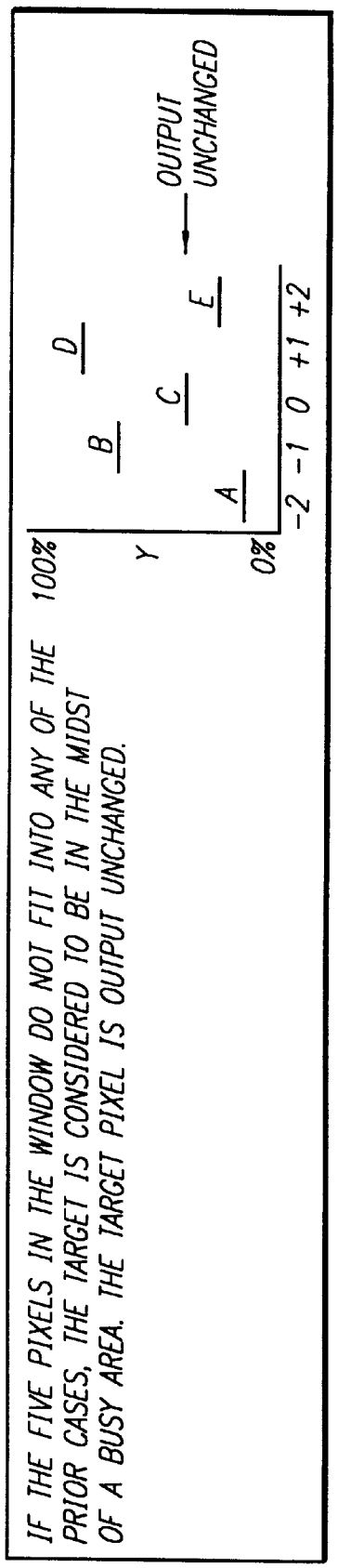
Figure 11A:
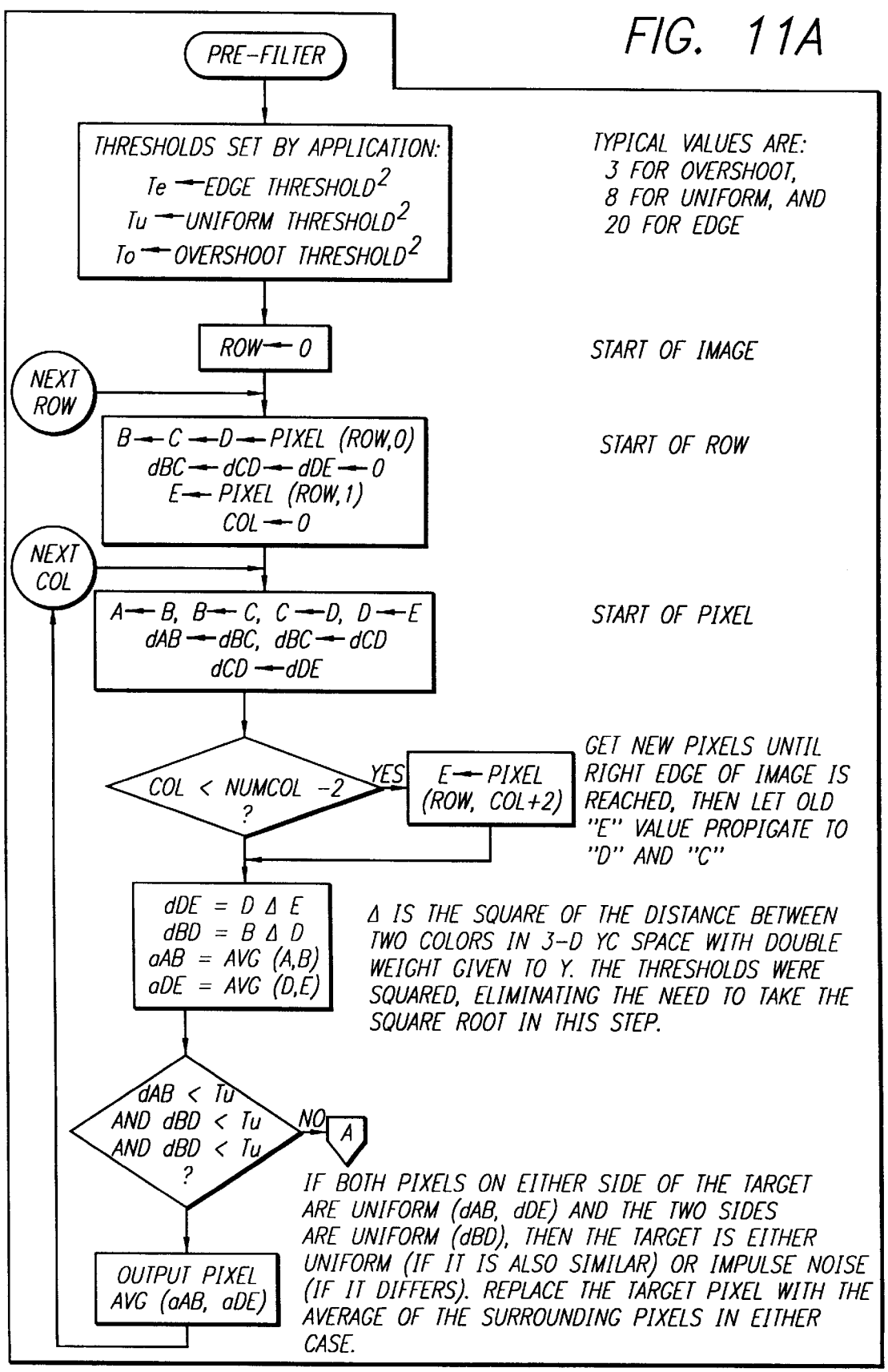
FIGS. 11A to 11D show a flow chart for the color image data preprocessing according to the method of the present invention for compressing color image data.
Figure 11B:
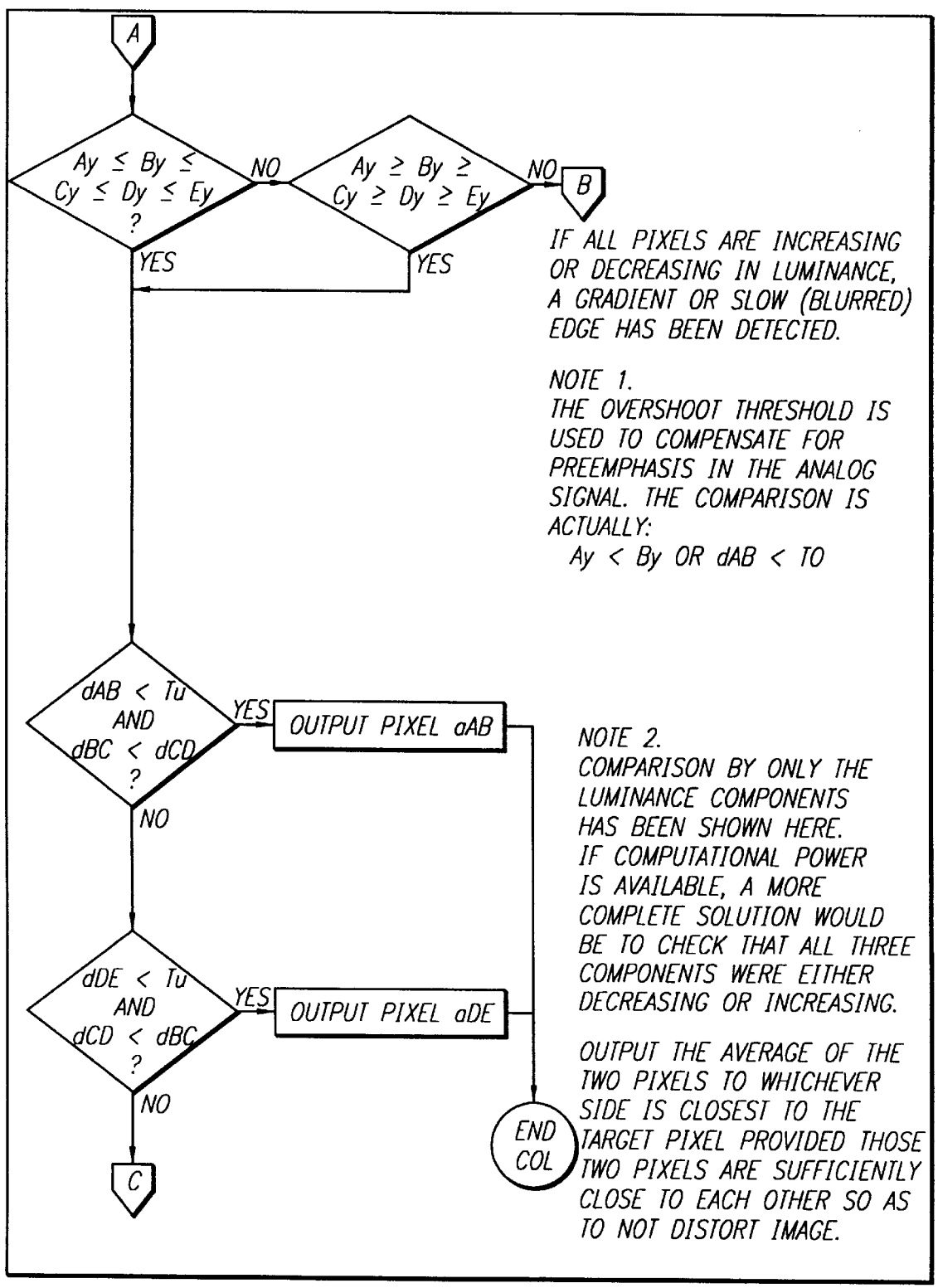
Figure 11C:
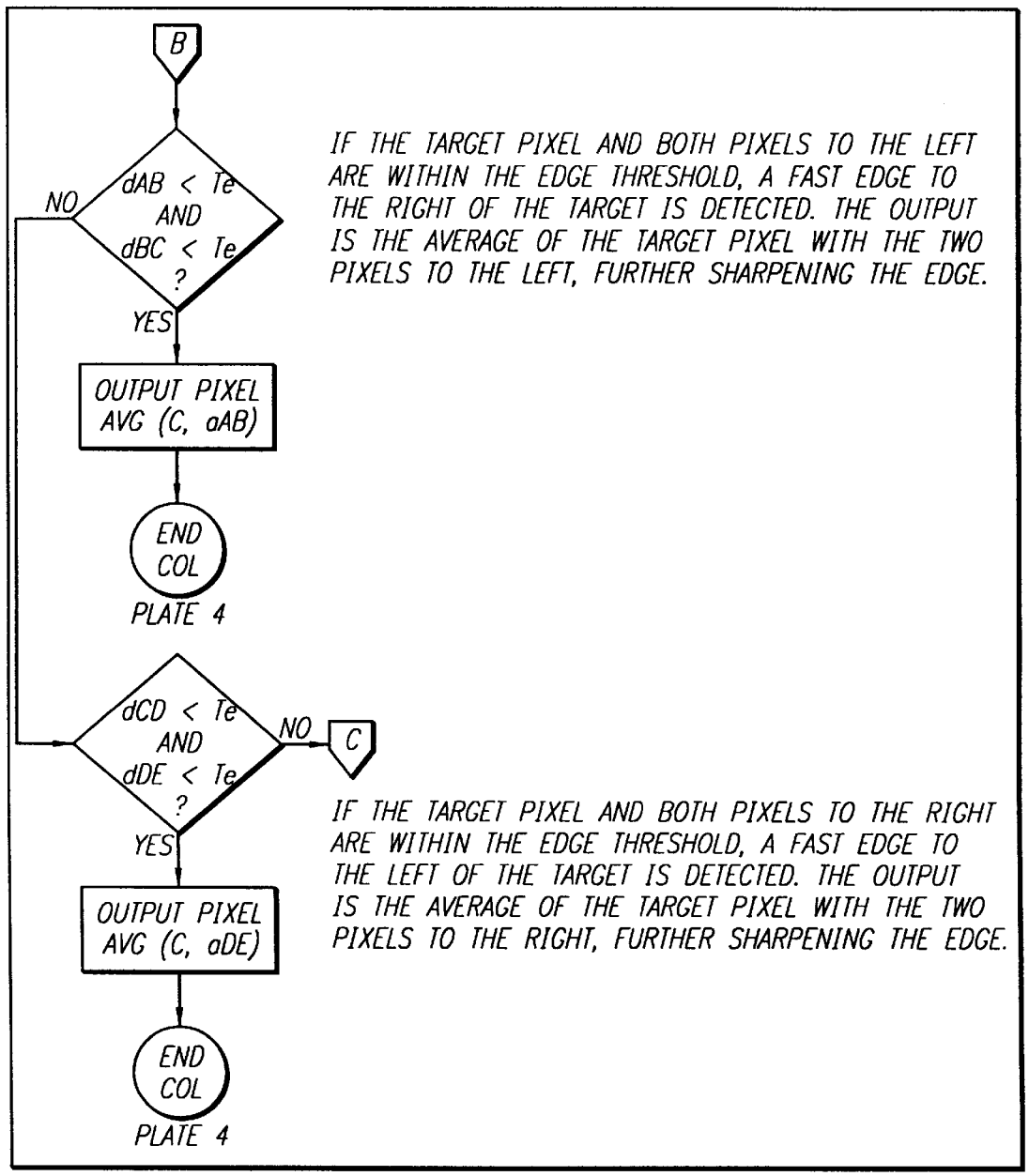
Figure 11D:
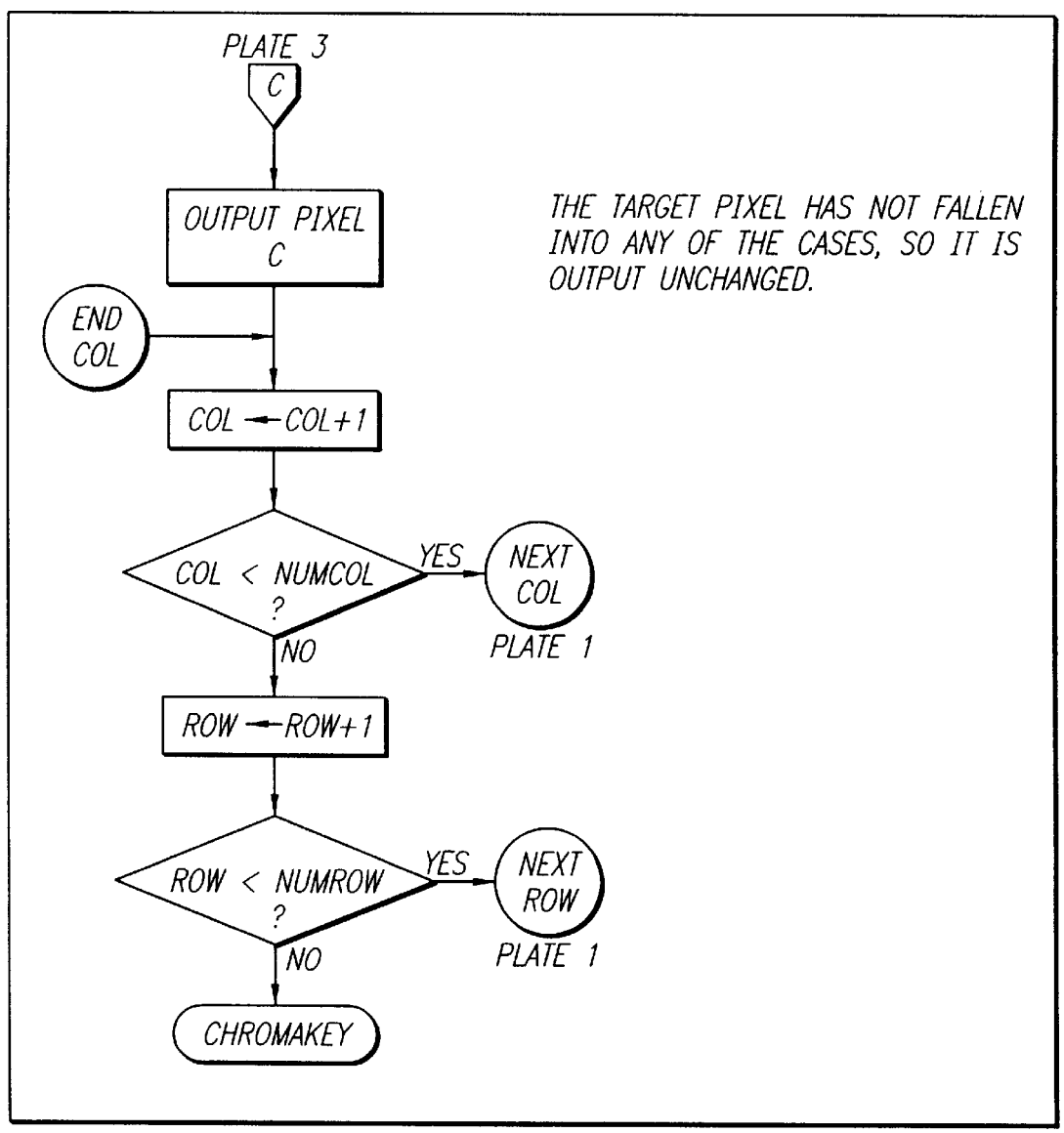

Referring to FIG. 6, in order to filter data for an individual target pixel, an average of the data for the pixels immediately surrounding the target pixel is taken, for those pixels surrounding the target pixel that are within a specified range of values. If all five pixels are within specified limits, the output is the average of four pixels in a raster line (A,B,D,E), two on each side of the target (C). If the two pixels on either side are within a specified range and both sides themselves are within the range, the target pixel is treated as impulse noise. As is illustrated in FIG. 7, the filtered output target pixel data is the average of the four pixels (A,B,D,E) on each side of the target pixel (C). Referring to FIG. 8, if the two pixels on either side of the target pixel and the target pixel itself are within a specified range, the target pixel (C) is considered to be an edge pixel. The output target pixel (C) is the average of the two pixels (A,B or D,E) on the matching side. If the five pixels are all increasing or decreasing (or are within a small range to account for ringing or pre-emphasis typically found in analog video signals), the target pixel is considered to be in the midst of a blurred edge. As is shown in FIG. 9, the output target pixel is then the average of two pixels (A,B) on whichever side is closest in value to the target pixel. As is illustrated in FIG. 10, if the five pixels in the window do not fit into any of the prior cases, the target is treated as being in the midst of a busy area, and the output target pixel is unchanged. The flow chart of FIGS. 11A to 11D illustrate the color image data preprocessing according to the method of the present invention.

Figure 12:
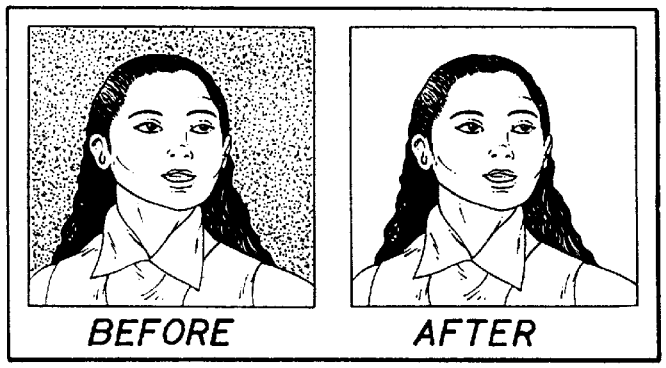
FIG. 12 illustrates the process of chromakeying an image with a background and a subject of interest before and after chromakeying of the image.
Figure 13:
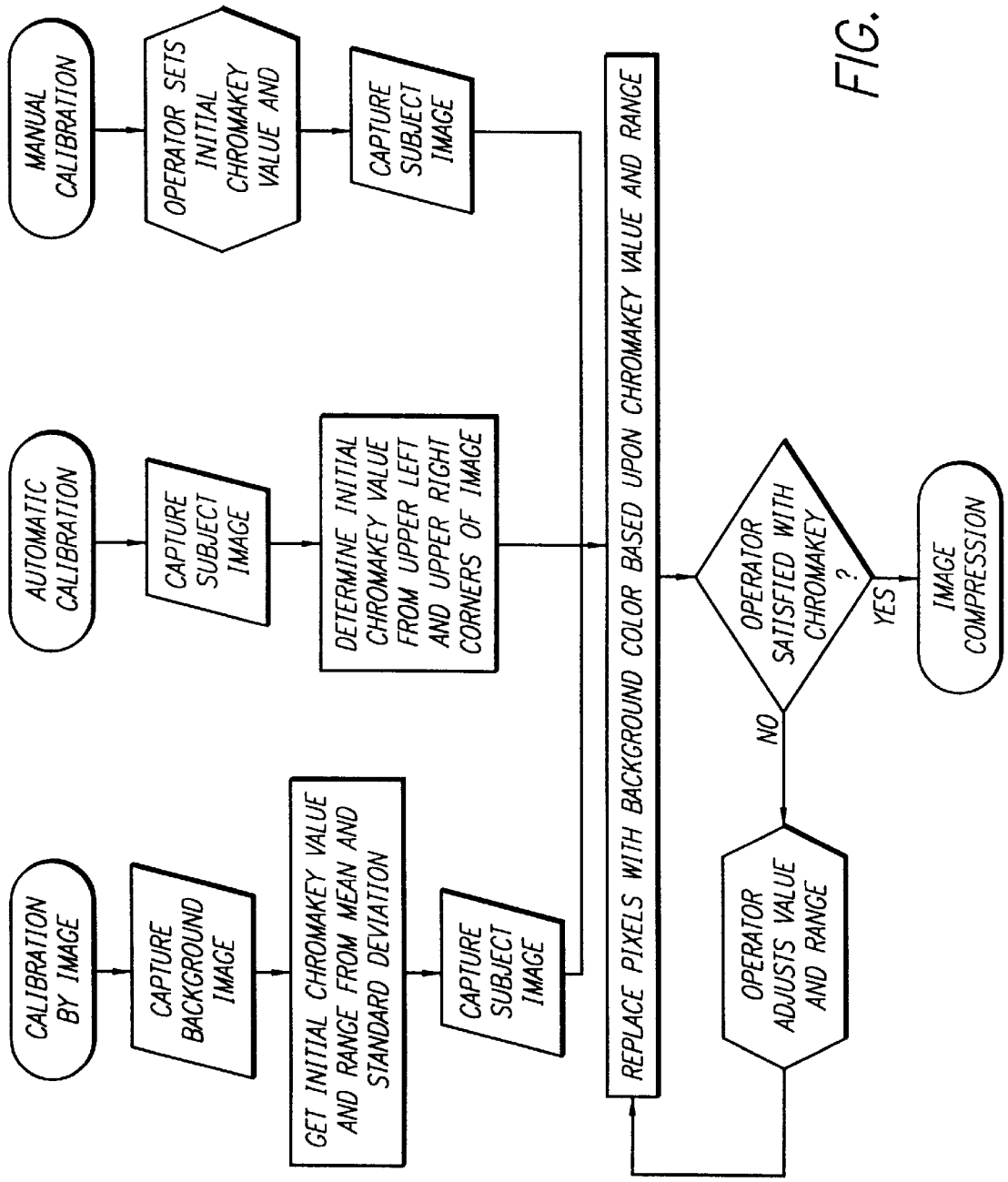
FIG. 13 is a flow chart of the steps for calibration of the chromakey color and range according to the method of the present invention for compressing color image data.

Three methods illustrated in the flow chart of FIG. 13 are used to set the initial chromakey value and color: calibration image, automatic, and manual. In the chromakey calibration image process, also illustrated in FIG. 12 showing a picture before and after being subjected to the chromakeying process, prior to capturing an image with the subject of interest in place, one or more calibration images are captured of the background consisting substantially entirely of background pixels. The average and standard deviation of those entire images are determined, and are used to set at least an initial chromakey color and range.

Figure 14:
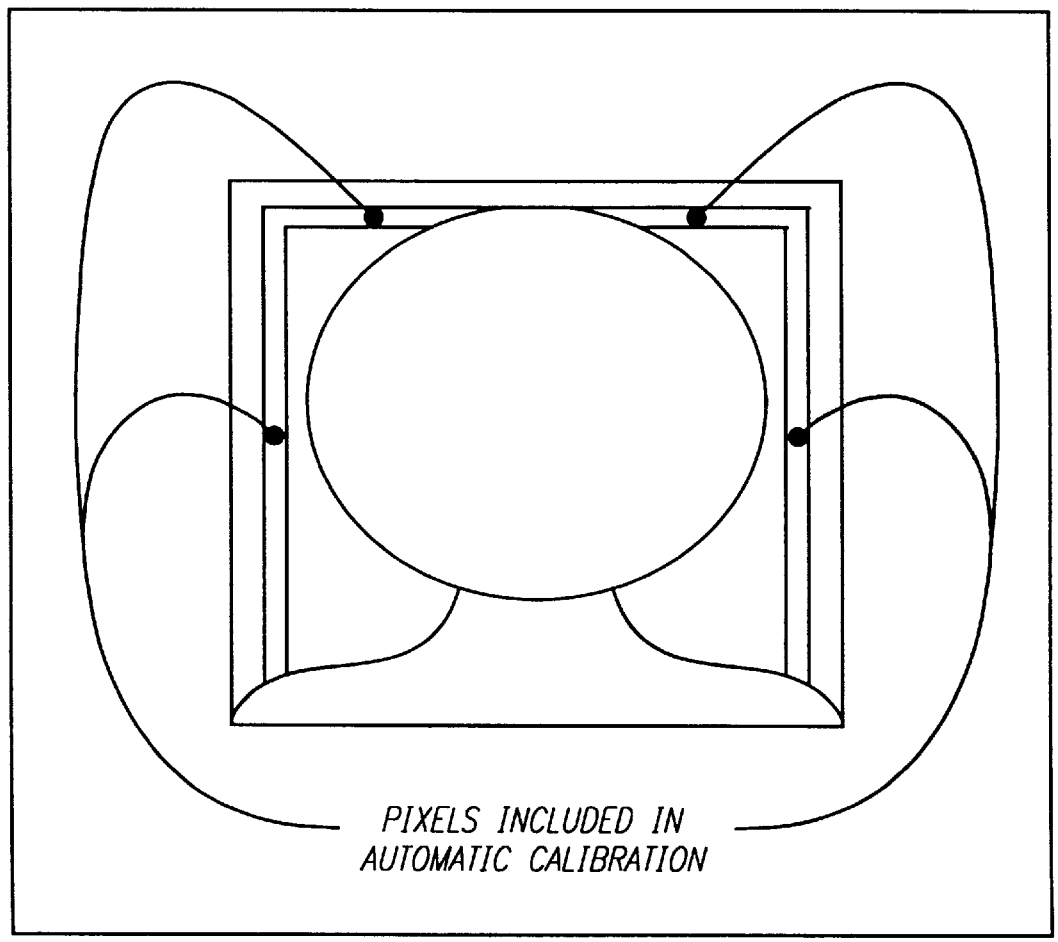
FIG. 14 is a diagram illustrating the automatic chromakey process according to the method of the present invention for compressing color image data.

In the automatic chromakey calibration process of the invention, illustrated in FIG. 14, an image is captured with the subject in place. Starting in the upper-left and upper-right corners of an image, pixels are collected down and towards the center until an edge or image boundary is encountered. The average and standard deviation of those pixels are calculated and used to set the initial chromakey value and range. For manual calibration the initial chromakey value and range are specified without respect to the properties of an individual image being captured prior to image capture.

In the multilevel statistical encoding of color image data according to the present invention, as illustrated in FIGS. 15A to 15C, 16 and 17A to 17E, the first portion of the actual process of compression typically involves dividing the color image into an array of 4×4 squares of pixels, and encoding each 4×4 square of pixels into a fixed number of bits that represent the sixteen pixels in the block. In the modified BTC algorithm the image is divided into 4×4 blocks of pixels, and the first sample moment (the arithmetic mean) and the second sample moment are determined. A selection map of those pixels having color values less than or greater than a quantizer set to the first sample moment is determined, along with a count of the lighter pixels. The sample variance and the standard deviation can thus be determined based upon the first and second sample moments. The mean, standard deviation, and selection map are preserved for each block. As adapted for YCrCb color, according to the method of the present invention, the first sample moment for each color component is thus determined according to the following equations:

$$\overline{Y} = \frac{1}{16}\sum_{i=1}^{16} Y_i$$

$$\overline{Cr} = \frac{1}{16}\sum_{i=1}^{16} Cr_i$$

$$\overline{Cb} = \frac{1}{16}\sum_{i=1}^{16} Cb_i$$

The second sample moment is determined according to the following equations:

$$\overline{Y^2} = \frac{1}{16}\sum_{i=1}^{16} (Y_i)^2$$

$$\overline{Cr^2} = \frac{1}{16}\sum_{i=1}^{16} (Cr_i)^2$$

$$\overline{Cb^2} = \frac{1}{16}\sum_{i=1}^{16} (Cb_i)^2$$

The standard deviation is determined according to the following equations:

$$\sigma_Y = \sqrt{\overline{Y^2} - (\overline{Y})^2}$$

$$\sigma_{Cr} = \sqrt{\overline{Cr^2} - (\overline{Cr})^2}$$

$$\sigma_{Cb} = \sqrt{\overline{Cb^2} - (\overline{Cb})^2}$$

Figure 15A:
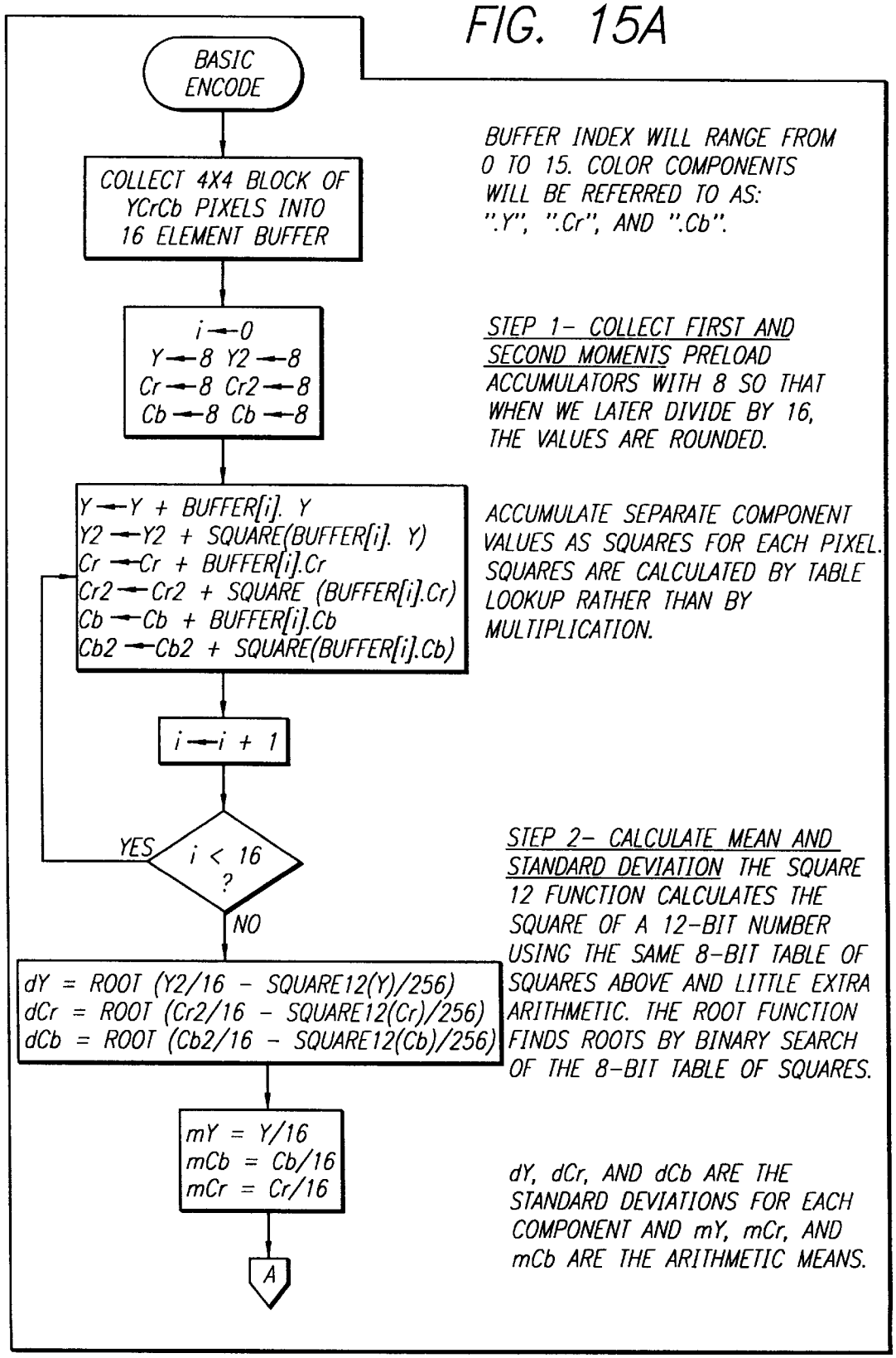
FIGS. 15A to 15C show a flow chart for multilevel encoding of color image data according to the method of the present invention for compressing color image data.
Figure 15B:
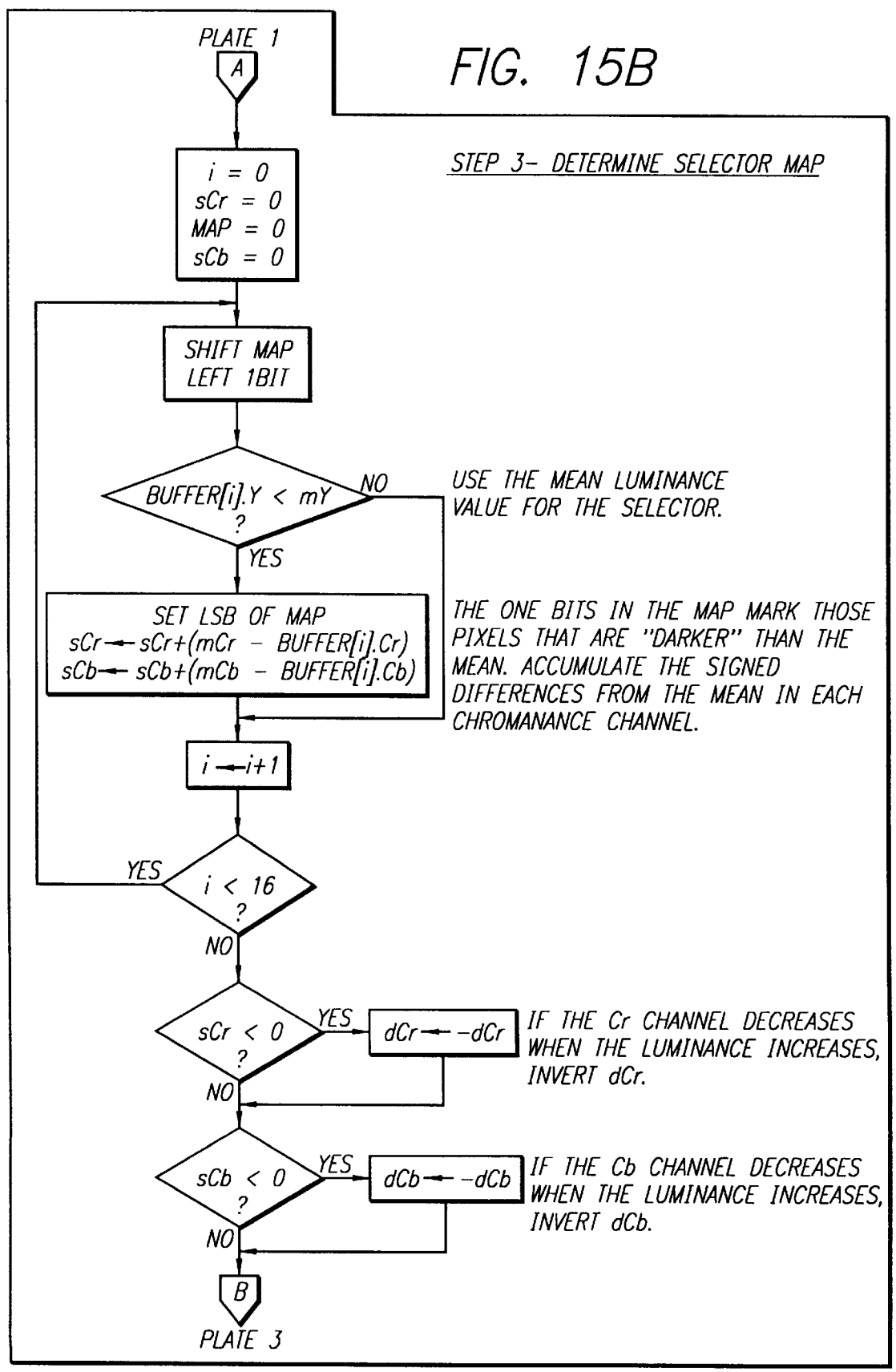
Figure 15C:
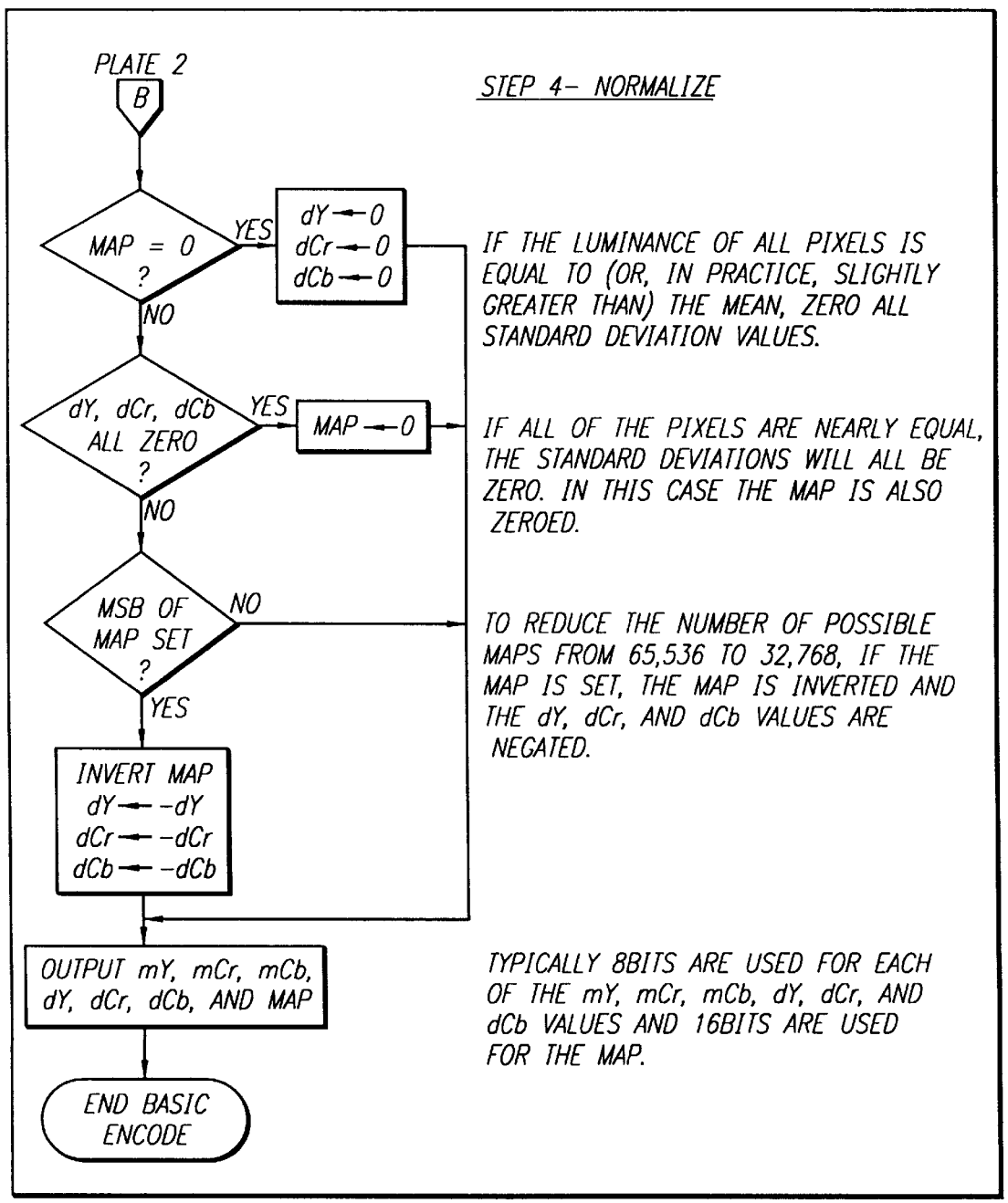

The selection map $m_i$ for each block is determined as is illustrated in FIGS. 15A to 15C, where:

$$m_i = Y_i < \overline{Y}, i=1 \ldots 16$$

Referring to FIG. 15A, each 4×4 block of pixels is collected into a 16 element buffer, in which the index ranges from 0 to 15. In the first step, the first and second moments are determined. Squares are preferably determined by table lookup using an 8-bit table of squares rather than by multiplication. In the second step, the mean and standard deviation are determined, using a square 12 function to determine the square of a 12-bit number based upon the same 8-bit table of squares above. The root function finds roots by binary search of the same 8-bit table of squares. In FIG. 15A, dY, dCr and dCb are the standard deviations for each component, and mY (mean luminance), mCr, and mCb are the arithmetic means. In the third step, illustrated in FIG. 15B, the selector map is determined from the mean luminance value mY for the selector. The one bits in the map mark those pixels that are "darker" than the mean. The signed differences are accumulated from the mean in each chrominance (Cr/Cb) channel. If the Cr channel decreases when the luminance increases, dCr is inverted. If the Cb channel decreases when the luminance increases, dCb is inverted. In the fourth step, illustrated in FIG. 15C, values are normalized. If the luminance of all pixels is equal to or slightly greater than the mean, all standard deviation values are zeroed. If all of the pixels are nearly equal, the standard deviations will all be zero, in which case the map is also zeroed. To reduce the number of possible maps from 65,536 to 32,768, if the MSB (most significant bit) map is set, the map is inverted and the dY, dCr, and dCb values are negated. Typically 8 bits are used for each of the mY, 5 mCr, mCb, dY, dCr, and dCb values, and 16 bits are used for the map.

The second half of the compression process involves taking the fixed bit (8 and 16 bit) length blocks encoded by the previous multilevel encoding step, and compressing them using minimum redundancy, variable-length bit codes.

The basic process for compressing a single encoded block comprises three steps: classification, quantization, and codebook compression. Before beginning the compression steps, however, the parameters used for the particular block must be established. Several parameters are used to control the compression process. The parameters specify tolerances for how blocks are classified, how many bits of which component in the encoded block will be preserved, and how precisely the selection map is preserved. Different sets of parameters may be used for "key" (or "delta") frames. For adaptive compression, each region of the image will use a different parameter set.

The basic codebook compression process consists of three steps: First, blocks are classified into four categories—null, uniform, uniform chroma, and pattern. Second, the number of bits for the Y and Cr/Cb components may be reduced, differently for each classification. Third, for uniform chroma and pattern classified blocks the texture map is tested against three groups of simpler, more common "pattern maps." Where the pattern map is sufficiently similar to the texture map from the encoder, it is used. Otherwise the entire 16-bit texture map is kept, as is described further below.

For multilevel compression, blocks can be processed (and therefore stored or transmitted) in either block order or level order. In block order, for each top level block, a top-level block is processed followed by the lower level blocks within the top level block. This method allows adaptive compression or selective processing of top-level blocks. In level order processing, all of the blocks of the top level are processed first, then each intermediate level, followed by the lowest level processing. This method allows for progressive decoding of still images where a very low resolution image can be displayed when the top level is decoded, and progressively higher resolution images can be displayed as each intermediate level is decoded, and finally the full resolution image can be displayed after decoding the level one data.

Adaptive compression is the process by which one section of the image is given priority over other areas. The emphasized section may be specified by the user or automatically selected according to certain predetermined criteria. The priority may either be more bits of quantization or tighter thresholds or both. In some cases, lower levels may not be processed for lesser priority blocks. Adaptive compression can thus also be implemented for storing photographic images.

Four codebooks are used in the basic compression process, one each for block classification, luminance difference, chrominance difference, and group three pattern maps, as is described further below. Different applications will have different distributions of values to be compressed.

The system of statistical encoding known as Huffman coding is used for constructing variable bit length codebooks based upon the frequency of occurrence of each symbol. For the ultimate use of this technique, a new set of codebooks would need to be constructed for each image and transmitted to the decoder. However, this process is usually not practical. The method of the present invention preferably includes several codebooks optimized for a variety of applications. Typically a single set of codebooks is used for an image, but if necessary, each set of parameters can specify different codebooks.

Once the block data and parameters have been collected, the block is classified as null, uniform, uniform chroma, or pattern. Null blocks exhibit little or no change from the higher level or previous frame. Run lengths of one to eight null blocks are collected, and no other information is preserved. The term "run length" is used here to indicate the number of conservative occurrences of null blocks before another classification occurs. Uniform blocks have a relatively low standard deviation, being less than a predetermined threshold, and are therefore relatively uniform in their change in color from the higher level or previous frame. The mean values for all three components are preserved.

Uniform chroma blocks have a significant luminance component to the standard deviation, but little chrominance deviation. The mean luminance and chrominance, standard deviation luminance, and a suitable selection map are preserved. Pattern blocks have significant data in both luminance and chrominance standard deviations. All components of the block are preserved. An additional classification, called an escape code, is also used to navigate the compressed bitstream.

After the block is classified as null, uniform, uniform chroma, or pattern, the number of bits to be preserved for each component of the block is set as follows:

|  | Y | Cr | Cb | $\sigma_Y$ | $\sigma_{Cr}$ | $\sigma_{Cb}$ | MAP |
|---|---|---|---|---|---|---|---|
| Null | 0 | 0 | 0 | 0 | 0 | 0 | 0 |
| Uniform | $b_{YU}$ | $b_{CU}$ | $b_{CU}$ | 0 | 0 | 0 | 0 |
| Uniform Chroma | $b_{YU}$ | $b_{CU}$ | $b_{CU}$ | $b_{YP}$ | 0 | 0 | Yes |
| Pattern | $b_{YU}$ | $b_{CU}$ | $b_{CU}$ | $b_{YP}$ | $b_{CP}$ | $b_{CP}$ | Yes |

For uniform chroma and pattern blocks, the selection map is preserved along with the color data. Three groups of common selection maps are identified by the compression method of the invention. The first two groups are fixed while the application developer can select from several codebooks for the third group. If a suitable match cannot be found in the three groups, the entire texture map is preserved.

The following notation is used when identifying selection maps:

| 0 | $b_{14}$ | $b_{13}$ | $b_{12}$ | For | 0 | 1 | 1 | 1 | =7528 H |
| $b_{11}$ | $b_{10}$ | $b_9$ | $b_8$ | example | 0 | 1 | 0 | 1 | in hexadecimal |
| $b_7$ | $b_6$ | $b_5$ | $b_4$ |  | 0 | 0 | 1 | 0 | notation. |
| $b_3$ | $b_2$ | $b_1$ | $b_0$ |  | 1 | 0 | 0 | 0 |  |

Since the selection map is normalized in the encoding step so that the MSB is zero, each map actually represents two.

| Group | Members | Implied Maps | Encoding |
|---|---|---|---|
| 1 | OOFF$_H$ 3333$_H$ | FFOO$_H$ CCCC$_H$ | 3 bits |
| 2 | OFFF$_H$ 7777$_H$ 1111$_H$ OOOF$_H$ | FOOO$_H$ 8888$_H$ EEEE$_H$ FFFO$_H$ | 4 bits |
| 3 | | By Codebook | typically 5 to 9 bits |
| 4 | | Actual Texture Map | 17 bits |

Figure 16:
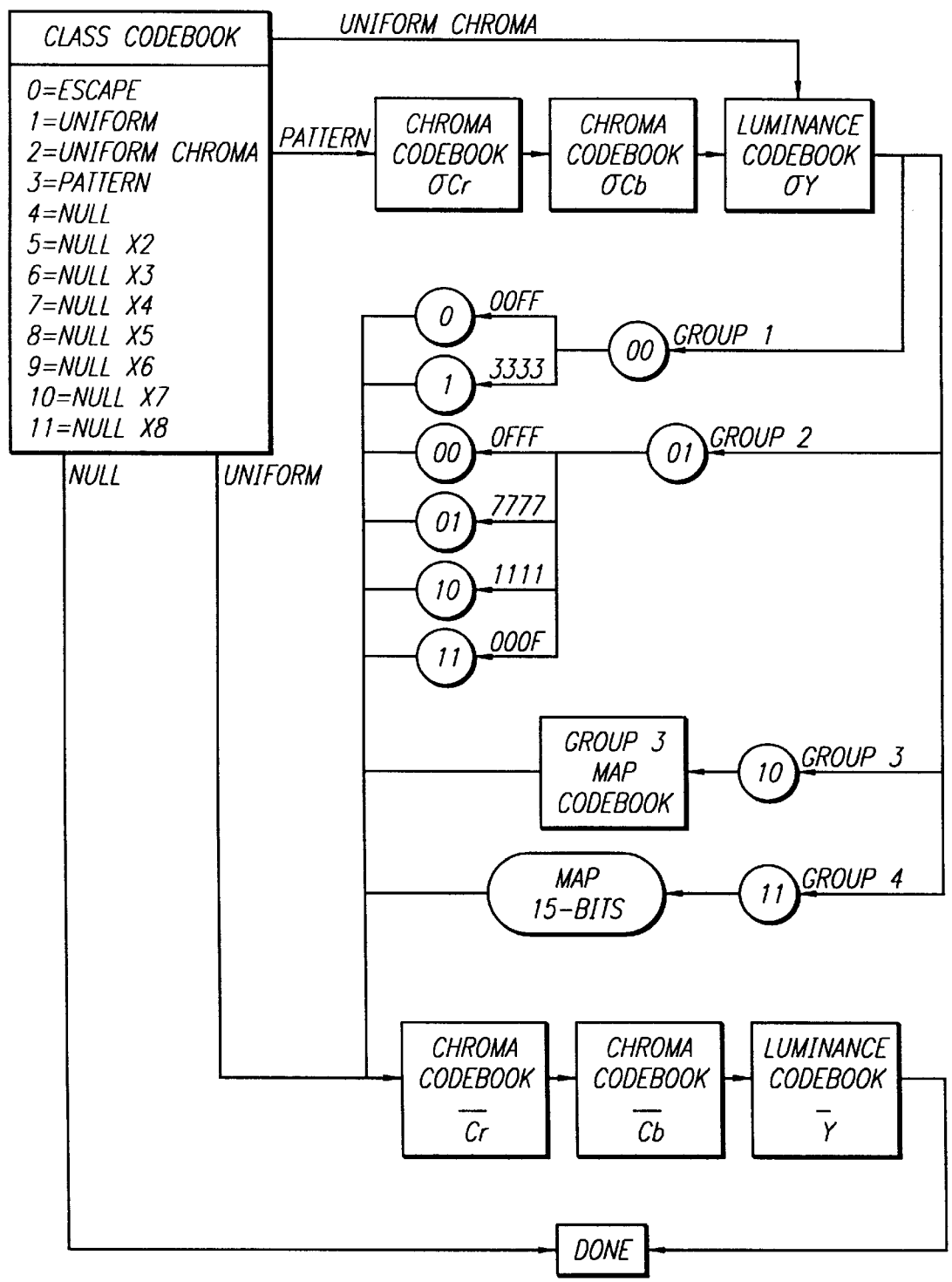
FIG. 16 is a flow chart illustrating the steps of encoding a bitstream according to the method of the present invention for compressing color image data.
Figure 17B:
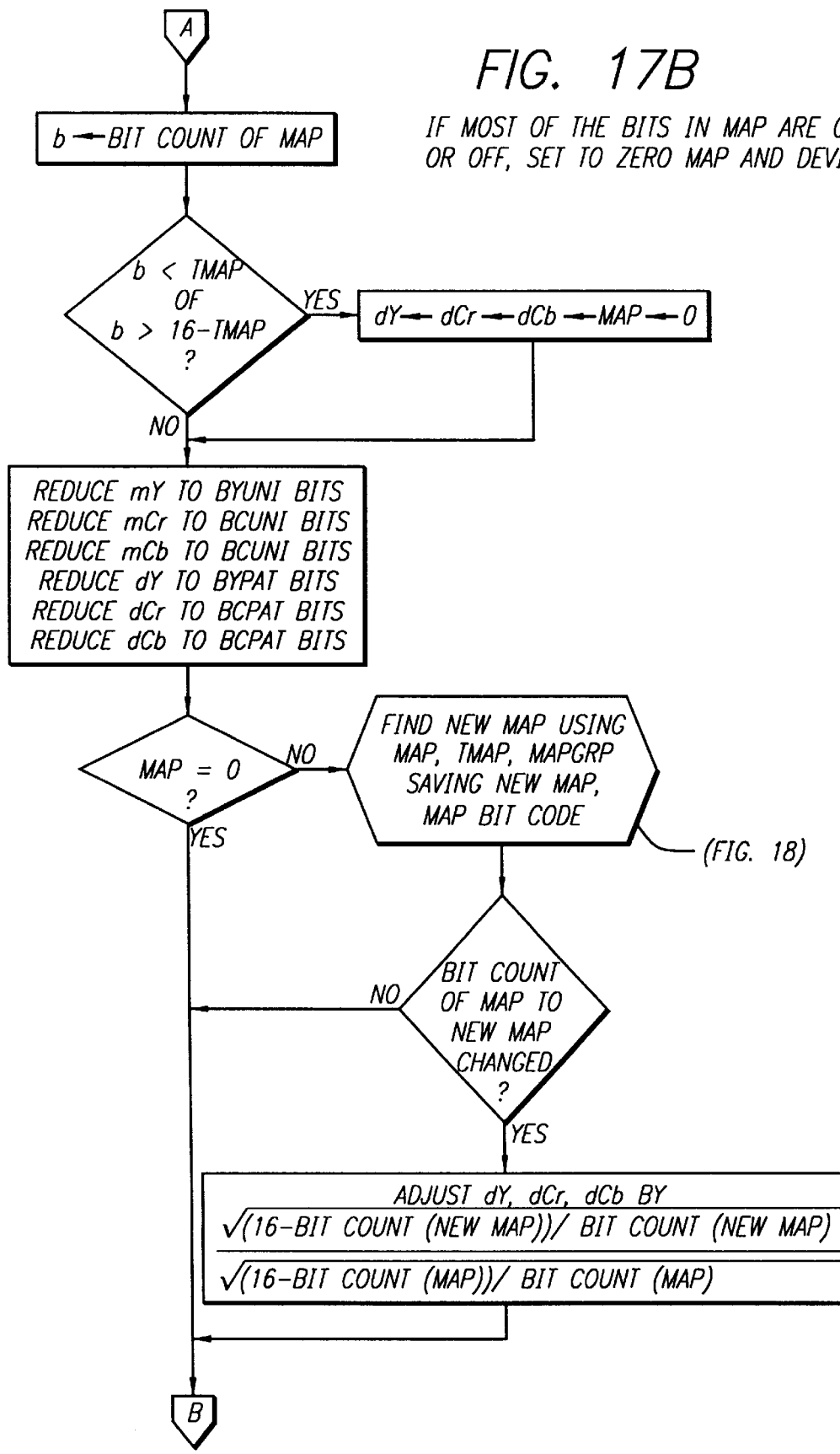
Figure 17C:
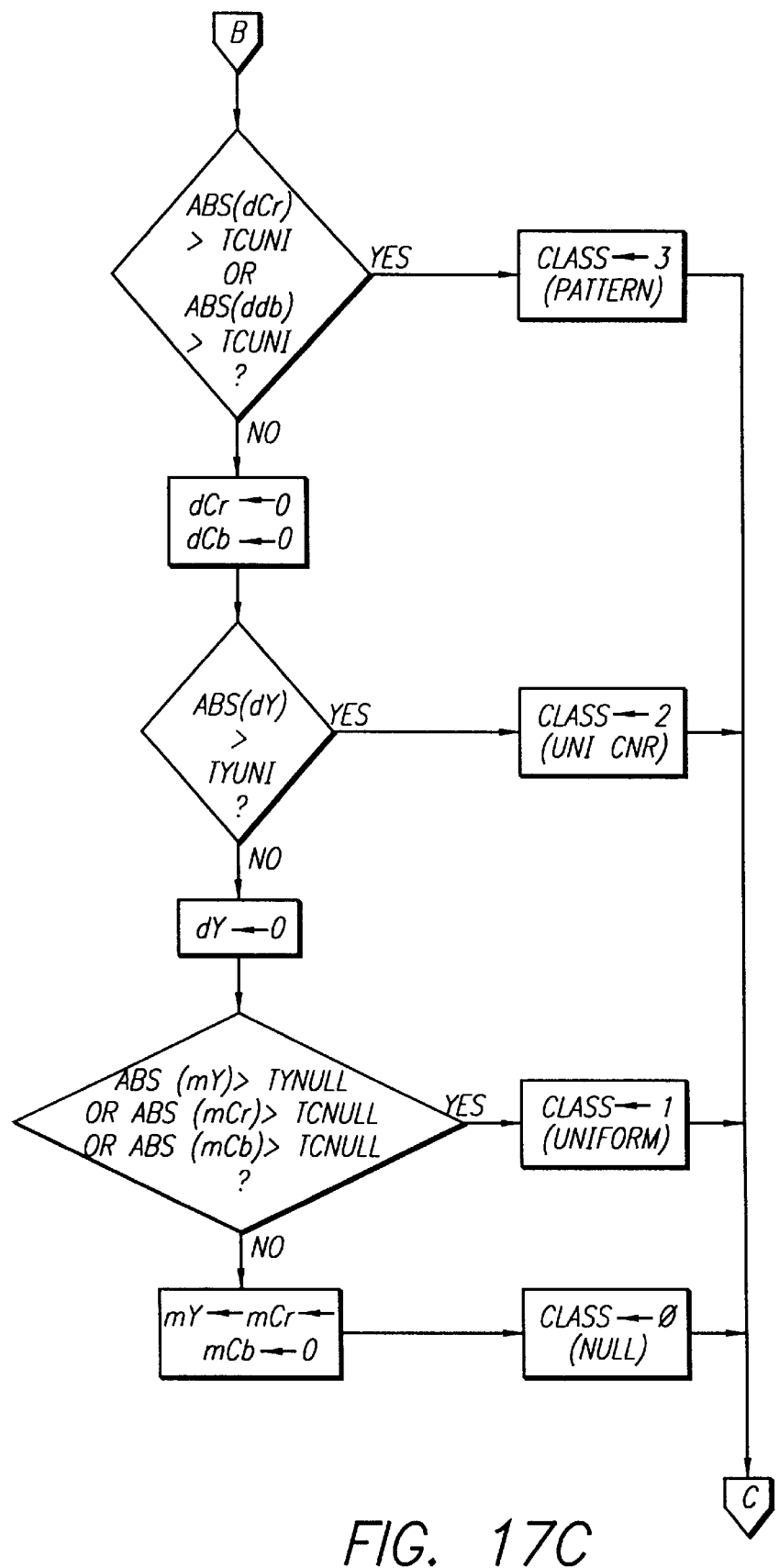
Figure 17D:
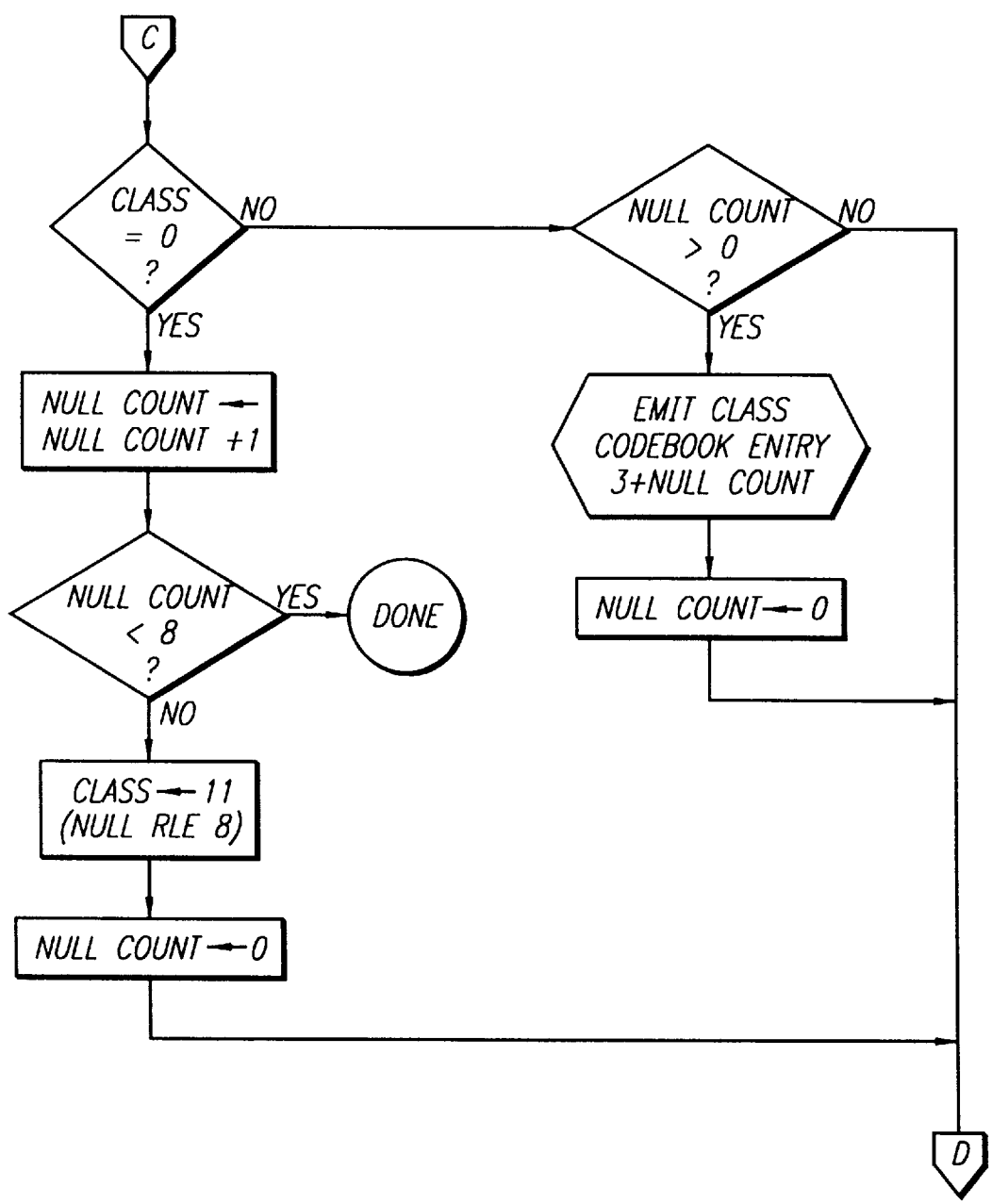
Figure 17E:
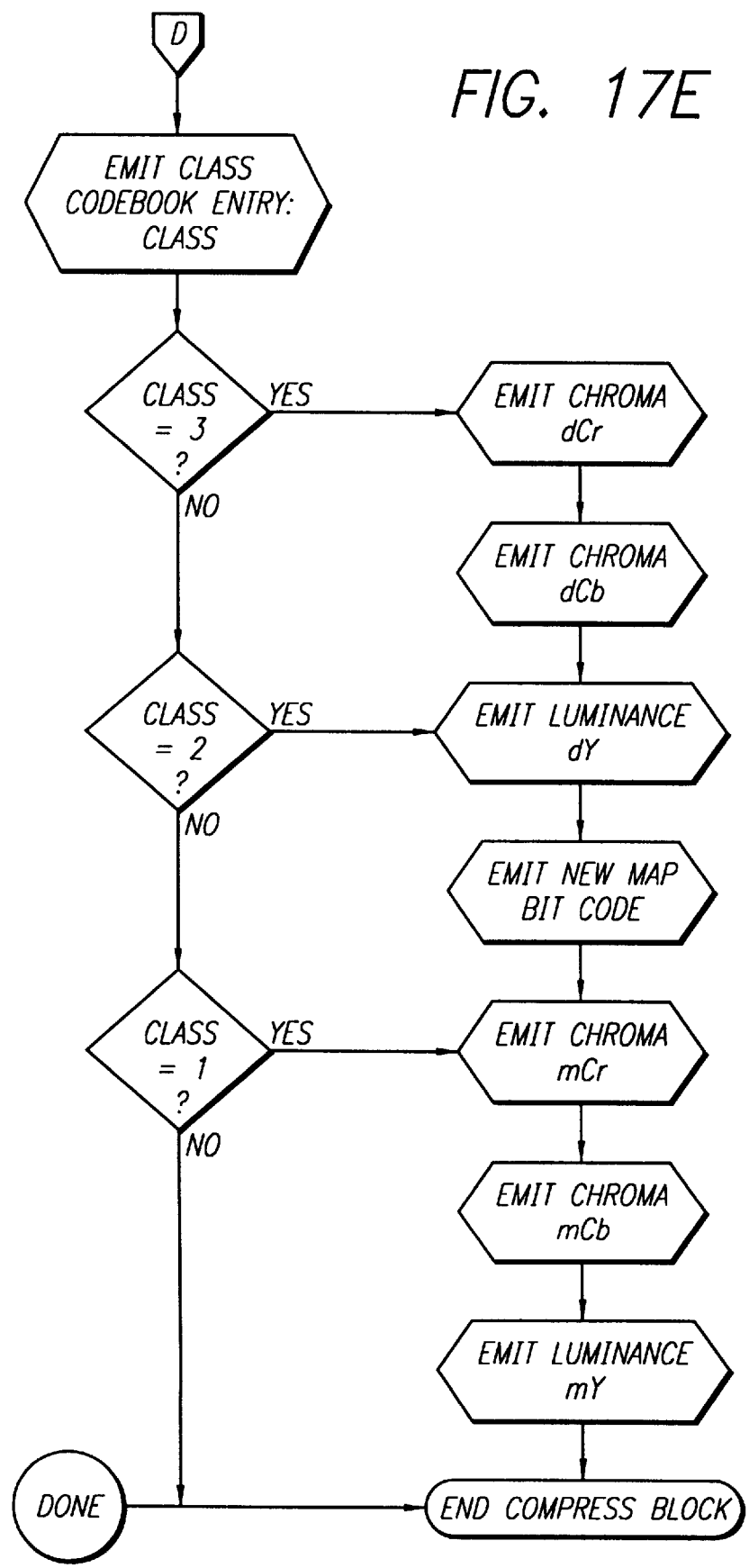
Figure 18A:
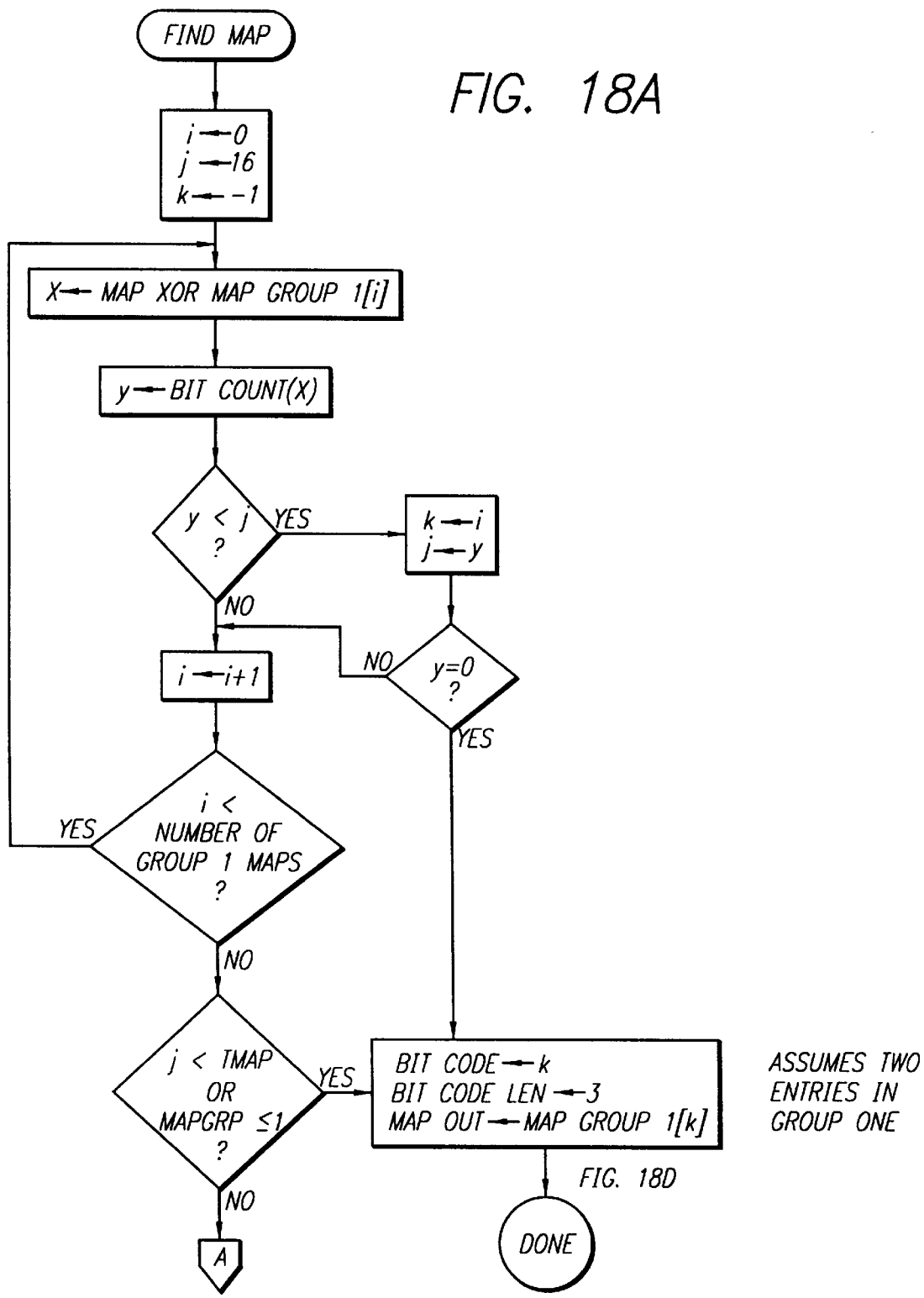
Figure 18C:
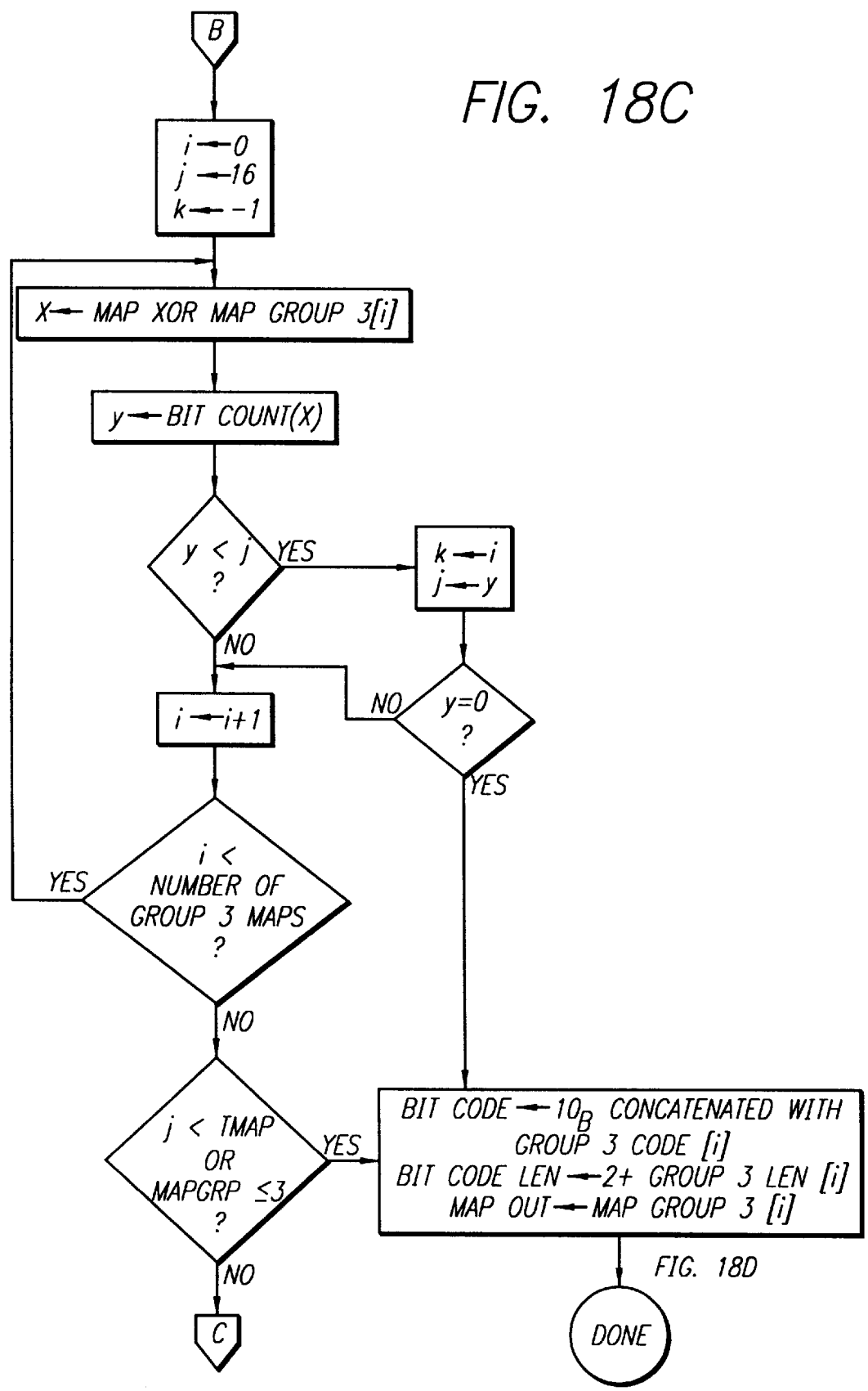
Figure 18D:
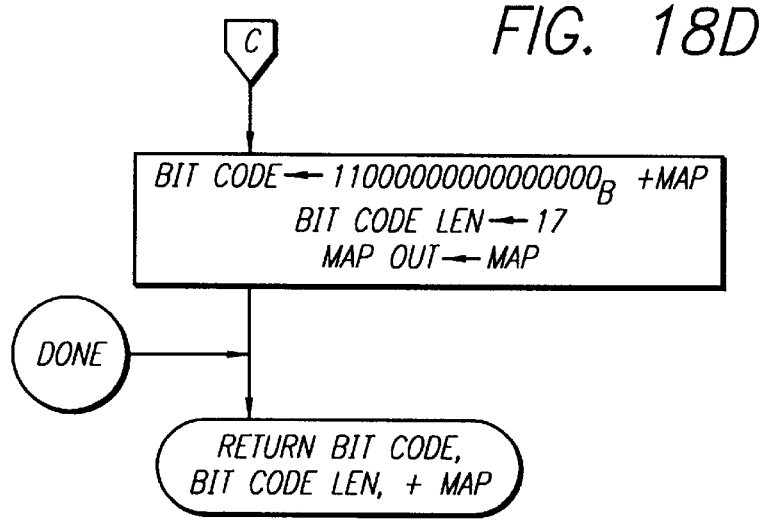

Since the decoded colors from a block depend upon the number of bits in the map, if a map that is substituted has a different number of bits, the standard deviation components of the block are adjusted. For each individual block, the bitstream is written as is illustrated in FIG. 16.

The classification codebook contains twelve entries, eight run lengths of null blocks and one each for uniform, uniform chromas, and pattern blocks, plus an entry for preceding escape codes. Escape codes are dependent upon the implementation and can be used to signal the end of an image, end of a block run, skipping to a different block, and the like.

Figure 19:
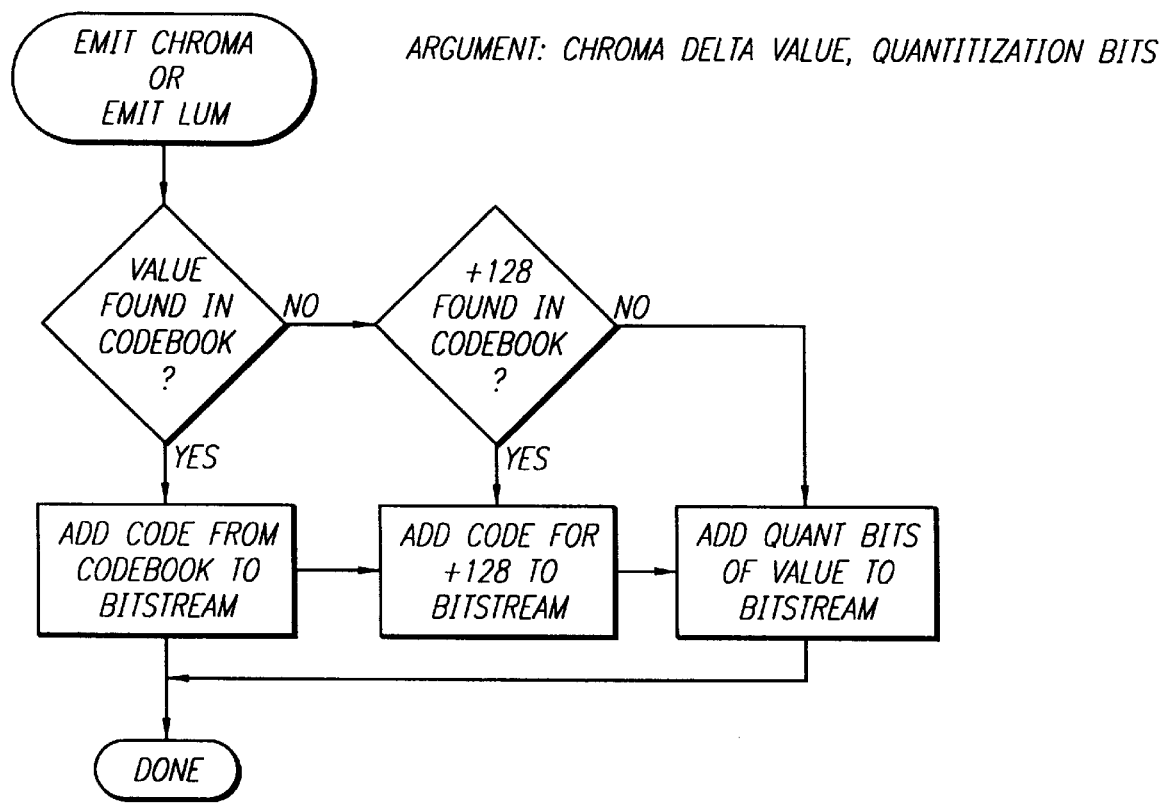
FIG. 19 shows a flow chart for encoding luminance or chrominance values by codebook lookup according to the method of the present invention for compressing color image data.

The luminance and chrominance codebooks contain the most often observed delta values—the luminance typically including +25 to −25 and chrominance from −6 to +6. For values that need to be coded and are not found in the selected codebook, an "other" entry at +128 is used, followed by the value, using the number of bits to which the value was quantized, as illustrated in FIG. 19.

Typical codebooks are shown in the following tables.

| Sample Luminance Codebook | | | | | |
|---|---|---|---|---|---|
| Value | Bits | Pattern | Value | Bits | Pattern |
| −4 | 3 | 000 | −10 | 6 | 000 |
| −8 | 4 | 0101 | 9 | 6 | 0101 |
| −7 | 4 | 0100 | 10 | 6 | 0100 |
| −6 | 4 | 1010 | 11 | 6 | 1010 |
| −5 | 4 | 0110 | 12 | 6 | 0110 |
| −3 | 4 | 1110 | 13 | 6 | 1110 |
| 3 | 4 | 1001 | −16 | 7 | 1001 |
| 4 | 4 | 0010 | ... | ... | ... |
| −9 | 5 | 10111 | −22 | 10 | 1111000111 |
| 5 | 5 | 11010 | −21 | 10 | 1111111101 |
| 6 | 5 | 10110 | −20 | 10 | 1111000110 |
| 7 | 5 | 01111 | −18 | 10 | 1100001001 |
| 8 | 5 | 10000 | −19 | 11 | 11111110101 |
| −11 | 6 | 001100 | −17 | 12 | 111111101001 |

| Sample Chrominance Codebook: | | | | | |
|---|---|---|---|---|---|
| Value | Bits | Pattern | Value | Bits | Pattern |
| −6 | 9 | 000000000 | 0 | 1 | 1 |
| −5 | 8 | 00000001 | 1 | 3 | 001 |
| −4 | 7 | 0000011 | 2 | 6 | 000011 |
| −3 | 6 | 000010 | 3 | 7 | 0000001 |
| −2 | 4 | 0001 | 4 | 8 | 00000101 |
| −1 | 2 | 01 | 5 | 8 | 00000100 |
| | | | 6 | 10 | 0000000011 |

It should be readily apparent that the system of the invention is also applicable to grayscale images, and other monochromatic images and chromatic image systems with pixels having scalar values. It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A smart card for storing a digitally compressed image, the image containing image data consisting of a plurality of scan lines of pixels with scalar values, comprising:

image data filtered by evaluation of the scalar values of individual pixels in the image with respect to neighboring pixels, said image data being statistically encoded by dividing the image into an array of blocks of pixels, and each block of pixels being encoded into a fixed number of bits that represent the pixels in the block;

wherein said image data is filtered by determining an average of the data for a window of the pixels immediately surrounding the target pixel for those pixels surrounding the target pixel that are within a specified range of values, according to the following protocol: if all five pixels are within the specified range, the output target pixel is determined to be the average of the four pixels in a raster line on each side of the target pixel; if the two pixels on either side are within a specified range and both sides themselves are within the range, the target pixel is determined to be impulse noise, and the filtered output target pixel data is determined to be the average of the two pixels on each side of the target pixel; if the two pixels on either side of the target pixel and the target pixel itself are within a specified range, and the other two pixels on the other side are not within the specified range, the target pixel is determined to be an edge pixel, and the output target pixel is determined to be the average of the two pixels on the matching side that fall within the specified range; if the five pixels are all increasing or decreasing, or are within a small range to account for ringing or pre-emphasis typically found in analog video signals, the target pixel is treated as being in the mist of a blurred edge, and the output target pixel is then determined to be the average of two pixels on whichever side of the target pixel is closest in value to the target pixel; and if the five pixels in the window do not fit into any of the prior case, the output target pixels is unchanged; and a memory storing said image data.

2. The smart card of claim 1, wherein said memory comprises a programmable microchip.

3. A smart card for storing a digitally compressed color image, the color image containing color image data consisting of a plurality of scan lines of pixels with color values, comprising:

color image data filtered by evaluation of the color values of individual pixels in the color image with respect to neighboring pixels, said image data being statistically encoded by dividing the color image into an array of blocks of pixels, and each block of pixels being encoded into a fixed number of bits that represent the pixels in the block;

wherein said color image data is filtered by determining an average of the data for a window of the pixels immediately surrounding the target pixel for those pixels surrounding the target pixel that are within a specified range of values, according to the following protocol: if all five pixels are within the specified range, the output target pixel is determined to be the average of the four pixels in a raster line on each side of the target pixel; if the two pixels on either side are within a specified range and both sides themselves are within the range, the target pixel is determined to be impulse noise, and the filtered output target pixel data is determined to be the average of the two pixels on each side of the target pixel; if the two pixels on either side of the target pixel and the target pixel itself are within a specified range, and the other two pixels on the other side are not within the specified range, the target pixel is determined to be an edge pixel, and the output target pixel is determined to be the average of the two pixels on the matching side that fall within the specified range; if the five pixels are all increasing or decreasing, or are within a small range to account for ringing or pre-emphasis typically found in analog video signals, the target pixel is treated as being in the mist of a blurred edge, and the output target pixel is then determined to be the average of two pixels on whichever side of the target pixel is closest in value to the target pixel; and if the five pixels in the window do not fit into any of the prior case, the output target pixels is unchanged; and a memory storing said color image data.

4. The smart card of claim 3, wherein said memory comprises a programmable microchip.

* * * * *